United States Patent
Bailey et al.

(10) Patent No.: US 10,102,199 B2
(45) Date of Patent: Oct. 16, 2018

(54) CORPUS SPECIFIC NATURAL LANGUAGE QUERY COMPLETION ASSISTANT

(71) Applicant: Microsoft Technology Licensing, LLC, Redmond, WA (US)

(72) Inventors: Peter Richard Bailey, Canberra (AU); David Anthony Hawking, Canberra (AU); David Maxwell, Scotland (GB)

(*) Notice: Subject to any disclaimer, the term of this patent is extended or adjusted under 35 U.S.C. 154(b) by 0 days.

(21) Appl. No.: 15/442,563

(22) Filed: Feb. 24, 2017

(65) Prior Publication Data
US 2018/0246878 A1    Aug. 30, 2018

(51) Int. Cl.
G06F 17/27    (2006.01)
G06F 17/30    (2006.01)

(52) U.S. Cl.
CPC ........ *G06F 17/2775* (2013.01); *G06F 17/276* (2013.01); *G06F 17/3097* (2013.01); *G06F 17/30401* (2013.01)

(58) Field of Classification Search
CPC ....................................................... G06F 17/27
USPC ........................ 704/233, 9; 715/727; 707/769
See application file for complete search history.

(56) References Cited

U.S. PATENT DOCUMENTS

| | | | |
|---|---|---|---|
| 5,519,608 A | 5/1996 | Kupiec | |
| 6,622,119 B1* | 9/2003 | Ramaswamy | ........ G06F 17/276 704/275 |
| 8,516,077 B2 | 8/2013 | Linyard et al. | |
| 8,706,476 B2 | 4/2014 | Daraselia | |
| 9,176,941 B2 | 11/2015 | Xiao | |
| 9,317,551 B1* | 4/2016 | Zander | .............. G06F 17/30864 |
| 2002/0005865 A1* | 1/2002 | Hayes-Roth | .......... G06N 5/043 715/706 |

(Continued)

FOREIGN PATENT DOCUMENTS

WO    2011042907 A1    4/2011

OTHER PUBLICATIONS

Language Processing, "Predicting Sentences using N-Gram Language Models", In Proceedings of the Conference on Empirical Methods in, Oct. 6, 2015, : Bickel, et al pages.

(Continued)

*Primary Examiner* — Michael Colucci
(74) *Attorney, Agent, or Firm* — Jeffrey L Ranck; Ranck IP Law

(57) ABSTRACT

Representative embodiments disclose mechanisms to complete partial natural language questions. Users enter a partial question. The system comprises a plurality of indexes, one index comprising common phrases associated with natural language questions and other indexes comprising short text entries associated with documents, such as document titles. The partial question is used to search one or more of the indexes. The search yields a ranked list of results. The top k entries of the list are selected and one or more language models are created from the top k entries. Each language model comprises n-grams from the top k entries from an index and an associated probability for each n-gram. A question completion generator creates question completion suggestions by matching n-grams with the partial question, removing ungrammatical candidate suggestions, and filtering the remaining suggestions per a filtering criteria. The top N results are returned as suggestions to complete the question.

20 Claims, 9 Drawing Sheets

(56) References Cited

U.S. PATENT DOCUMENTS

| | | | |
|---|---|---|---|
| 2008/0195378 A1* | 8/2008 | Nakazawa | G06F 17/30654 704/9 |
| 2008/0319962 A1* | 12/2008 | Riezler | G06F 17/30672 |
| 2009/0172514 A1* | 7/2009 | Radovanovic | G06F 17/30864 715/212 |
| 2010/0145694 A1* | 6/2010 | Ju | G10L 15/1815 704/235 |
| 2010/0285435 A1 | 11/2010 | Keim et al. | |
| 2010/0312549 A1 | 12/2010 | Akuwudike | |
| 2011/0066634 A1* | 3/2011 | Phillips | G10L 15/22 707/769 |
| 2011/0295878 A1 | 12/2011 | Bennett et al. | |
| 2012/0089584 A1* | 4/2012 | Yoon | G06F 17/30867 707/706 |
| 2012/0191502 A1* | 7/2012 | Gross | G06Q 10/0633 705/7.27 |
| 2012/0297294 A1 | 11/2012 | Scott et al. | |
| 2013/0111348 A1* | 5/2013 | Gruber | G06F 17/3087 715/727 |
| 2014/0012567 A1 | 1/2014 | Caskey et al. | |
| 2014/0058725 A1 | 2/2014 | Longe et al. | |
| 2015/0039292 A1* | 2/2015 | Suleman | G06F 17/289 704/9 |
| 2015/0088850 A1* | 3/2015 | Nijjer | H04L 63/08 707/706 |
| 2015/0186504 A1* | 7/2015 | Gorman | G06F 17/2705 707/752 |
| 2015/0347383 A1* | 12/2015 | Willmore | G06F 17/276 704/9 |
| 2015/0378988 A1* | 12/2015 | Chewning | G06F 17/2705 704/9 |
| 2017/0017635 A1* | 1/2017 | Leliwa | G06F 17/271 |
| 2017/0061019 A1* | 3/2017 | Chitta | G06F 17/30861 |
| 2017/0228367 A1* | 8/2017 | Pasupalak | G06F 17/279 |

OTHER PUBLICATIONS

"Typing Assistant", http://www.sumitsoft.com/, Published on: Dec. 22, 2015, 4 pages.

Qiu, et al., "Confabulation Based Sentence Completion for Machine Reading", In IEEE Symposium on Computational Intelligence, Cognitive Algorithms, Mind, and Brain, Apr. 11, 2011, 8 pages.

* cited by examiner

CORPUS SPECIFIC NATURAL LANGUAGE QUERY COMPLETION ASSISTANT

FIELD

This application relates generally to query systems. More specifically, embodiments disclosed herein include autosuggest and/or autocomplete technology for use in a wide variety of contexts where a system can suggest autocompletion of a query or question, particularly with natural language questions.

BACKGROUND

Many systems allow users to enter queries and/or questions (hereafter referred to collectively as questions) into a system for a variety of purposes, such as search, providing instructions to a digital assistant, interacting with a chat bot, and so forth. As the user types in the question, the system can monitor the keystrokes and provide a list of suggestions on how the question can be completed. When the user sees a question they are trying to type and/or that they like, they can scroll down and press 'enter' or otherwise indicate that is the question they would like to submit. The goal of autocomplete systems is to eliminate work on the part of the user (i.e., prevent the user from having to type in the complete question).

Modern autosuggest or autocomplete systems are built for a task-specific style of language, such as web search that differs from natural language, and typically rely on having seen millions of examples of previous queries. These memorized queries are retrieved using a matching process as the user types, predicting the next word or phrase based on the probabilities predicted by the memorized transactions.

Modern autocomplete systems typically use a trie data structure for extreme efficiency because the suggestions must be returned in a few milliseconds to avoid disrupting the user's typing pattern. (Suggestions should not be shown substantially slower than user keystroke speed.) A trie is a densely packed tree data structure where each vertex node in the tree contains entries. For query autocomplete purposes, the path to the node is encoded as the series of characters of the query prefix. This approach relies on memorization of past queries that can be stored in the trie, and thus cannot make suggestions when query prefixes are not already stored in the trie.

A variant approach to this one supports simple rotations of terms from the prefix that do have entries in a trie. This extends the coverage beyond exact query prefix matching, but still relies on known queries being stored in the trie. Due to performance considerations, it is not possible to consider all possible permutations of the prefix.

It is within this context that the present embodiments arise.

DETAILED DESCRIPTION

Figure 1:
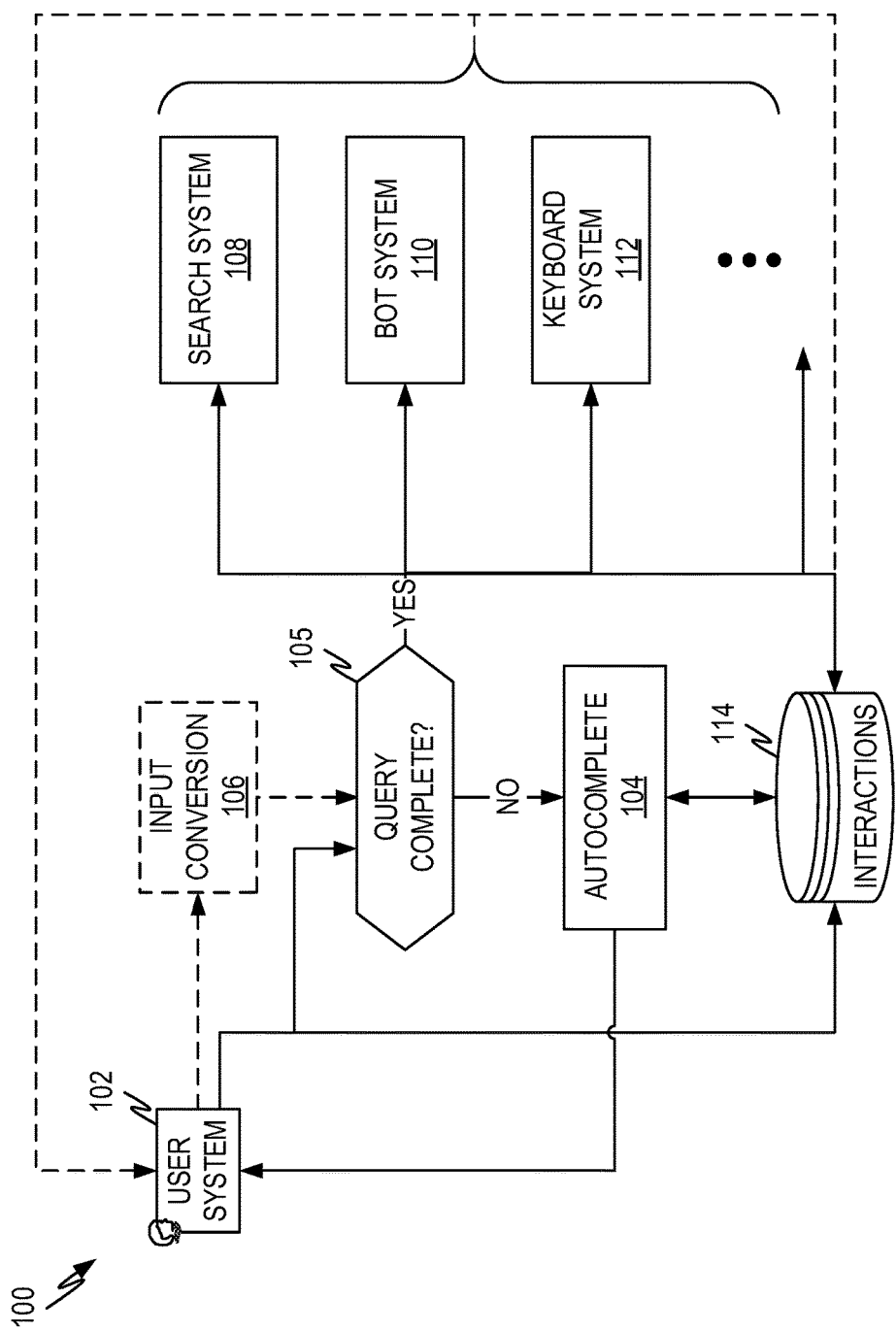
FIG. 1 illustrates an example autocomplete architecture according to aspects of the disclosure.

The description that follows includes illustrative systems, methods, user interfaces, techniques, instruction sequences, and computing machine program products that exemplify illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Overview

Embodiments of the present disclosure target the "long tail" problem of question completion systems, particularly in the context of natural language questions. Question completion systems typically rely on statistics developed from tracking a large number of questions. However, even large search services like Bing® and/or Google® with vast amounts of history about what questions users enter see new entries every day.

Furthermore, there is an implied promise to a user that when a system suggests a question, such as through autocomplete, that if the user enters selects and enters the question, that at least one document exists that will be retrieved by the question. Having a system suggest a question that does not retrieve any documents violates this implied promise and leads to frustrated users. Traditional methods that rely on questions the users enter have no way of ensuring that this implied promise is kept (i.e., that a suggested question will retrieve at least some search results) since the traditional approaches only focus on the questions that are entered (i.e., what uses are likely to type) rather than on the results that are retrieved.

Embodiments of the present disclosure avoid the problems of traditional approaches by using multiple indexes to complete a natural language question. A natural language question typically begins with a question prefix that is common to many questions. For example, variants of phrases containing who, what, when, where, why, and how often begin a question. Examples include "tell me about" or "when did" or "where is" and so forth. These are often treated as "stopwords" in traditional approaches and hold little information about the subject and/or topic of the question. However, they represent at least a part of a properly formed natural language question. Therefore, at least one of the indexes can comprise common question terms.

After the initial portion of a question, terms indicating the subject and/or topic of the question often arrive. For example, the "tell me about" may be followed by terms indicating what the user wishes to know. Thus, other indexes can derive from one or more corpus of selected documents as the basis for question completion suggestions. The corpus is selected from a larger document set in some instances. The corpus is stored in a short text index that allows real-time or near real-time search from the corpus. Depending on the embodiment, different indexes can be used for different topics or all short text entries can be stored in a common short text index.

As a user begins entering a question, a selection component selects one or more indexes to search. The indexes can be selected in a variety of ways such as by topic, based on term probability, and so forth.

Once the indexes to be searched are selected, the system searches the selected indexes using the question prefix that has been entered by the user. The indexes return a ranked list of entries. Depending on the index searched, these can be question term entries (i.e., entries from the question term index) or short text entries from one or more of the short text indexes. The list is pruned if there are more than a certain number of entries or the question is expanded if the list has too few entries. The result of these operations is a list of an appropriate length.

A language model is created for the entries from each of indexes that were searched. For example, if multiple short text indexes are searched, the entries from each individual short text index can be used to create a language model. Thus, multiple language models may be utilized in some embodiments. In other embodiments, the list of entries can be used to create a single language model.

Each language model comprises n-grams derived from the entries from an index. The n-grams all have an associated probability that represents the probability of the n-gram in the list of entries used to derive the language model. The language model(s) and the question prefix is passed to a question completion generator. The question completion generator utilizes the language model, the question prefix, and stored user interaction information to create a list of suggested question completion options. The list is formatted and passed to the user via a user interface that allows the user to select one of the list as a question if desired.

Interactions of the user with question completion suggestions are stored in an interaction data store and used to perform such functions as selecting an index, creating question suggestions and so forth.

Description

Autosuggest/autocomplete systems look at the characters entered by a user and attempt to predict what the user will type next in order to suggest words and/or phrases to complete what the user is typing. In this disclosure, the term autocomplete will be used for the systems, etc. that perform the autosuggest/autocomplete function. Autocomplete systems are useful in any context where a user enters information into a system, such as a search systems, chat systems, bot systems, digital assistants, keyboard systems (i.e., where a user enters text such as on a virtual keyboard), and so forth. The text that a user enters will be referred to herein as a question even though the different systems where information is entered may not actually use questions as such. A partial question or question prefix (also referred to simply as a prefix) will be used herein to refer to that portion of the question that the user has entered so far. The disclosure references a corpus of documents from which a short text index is derived. The term document should be read broadly and can include any type of electronic document, such as web pages, word processing or other text type documents, multi-media documents, and so forth.

FIG. 1 illustrates an example autocomplete architecture 100 according to aspects of the disclosure. This figure illustrates how an autocomplete system can fit into a representative context. The user begins entering a question through a user system 102. The question can be entered in any format such as text, voice, gesture, and so forth. Generally, autocomplete systems 104 are set up to operate on text information. Thus, if the input is not in a textual format, the input can be converted to text through an input conversion process 106. Thus, voice input can be converted using a text to speech conversion process.

The partial question (i.e., prefix) is tested to see if the question is complete (operation 105). If the question is complete, the question is passed to a system which handles the question. Depending on the context, this could be a search system 108, a bot system 110, a keyboard system 112, or any other system. The system can identify a completed question through the press of an enter key, a gesture, or other event that signals that the user is finished entering the question.

The question prefix is sent to autocomplete system 104 and autocomplete system utilizes the prefix to derive a list of suggestions to complete the prefix and sends them back to the user system 102. Suggestions should be shown in less-than-keystroke time. A typical keystroke speed is around 160 msec., although this time is not absolute because variations in question entry speed, user perceptions, and so forth. Thus an individual implementation can be tuned to adjust this time until the system feels responsive enough for a typical user, resulting in different processing times for different users. Thus, the operations performed by the autocomplete system 104 should be complete in around 160 msec., or other keystroke time in order to appear to act in "real time" to a user entering a question.

The autocomplete system operates on keystrokes as the user enters the question until the user either completes entering the question (i.e., because the user didn't select any of the suggestions) or until one of the suggestions are selected and entered. At that point, the completed question is forwarded (i.e., operation 105) to one or more systems served by the autocomplete system 104.

Autocomplete suggestions and user interactions are stored in a user interaction database 114 as explained in greater detail below. These interactions are available to the auto-suggest system and can be used for various purposes as explained below.

Figure 2:
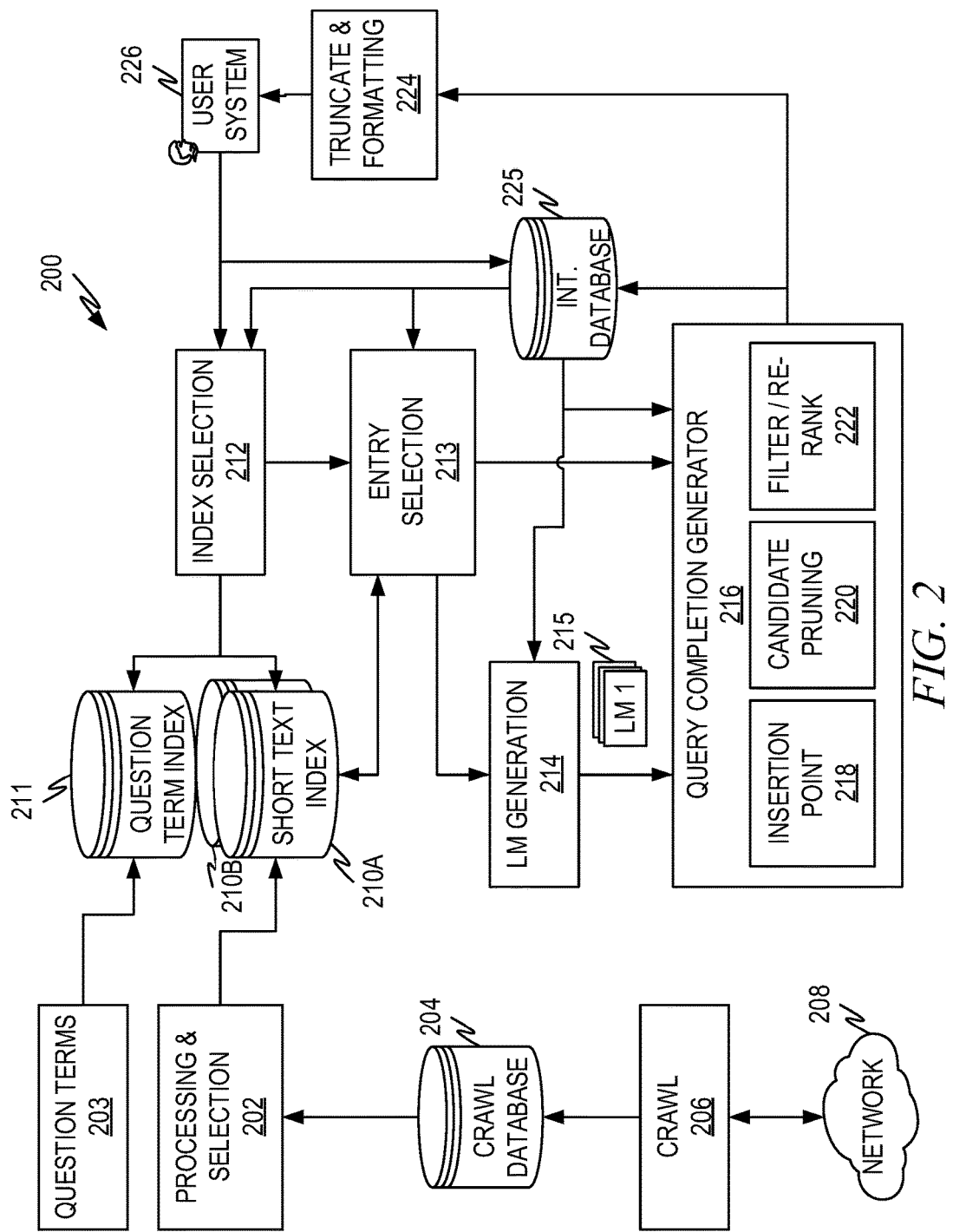
FIG. 2 illustrates an example autocomplete architecture according to aspects of the disclosure.

FIG. 2 illustrates an example autocomplete architecture 200 according to aspects of the disclosure. This architecture 200 could be a representative architecture of the autocomplete system 104 of FIG. 1.

Embodiments of the present disclosure utilize one or more indexes 210A, 210B, 211. The indexes can comprise one or more short text indexes 210A, 210B, as discussed below. The indexes can also comprise a question term index 211. The short text index 210A, 210B comprises entries that are relatively short in length, much shorter than the underlying documents represented by the individual entries. In some embodiments, the short text entries are no longer than about 10 to 15 words in length. In other embodiments, the short text entries are no longer than about 20 to 40 words in length. In yet another embodiment, the short text entries are no longer than about 100 words in length.

Each entry in the short text index 210A, 210B is associated with an underlying document. Various methodologies can be used to derive the short text entry associated with a document. The short text entry should be a summary of the content of the document. In one embodiment, the short text entry is the title of the document. In other embodiments, a summary other than the title can be used if the entry is a short summary (i.e., describes the content of the document within the word length limits) of the underlying document.

The short text index 210A, 210B represents a corpus of documents (i.e., for each short text index) that the autocomplete system will operate over. In other words, suggestions provided by the autocomplete system, when selected by the user and executed by a system, will retrieve at least some of the underlying documents used to create the short text index 210A, 210B. Thus, embodiments of the disclosure work particularly well where a corpus of documents are of interest, such as in a corporate environment where corpus can comprise the documents in the corporation.

How the short text index 210A, 210B is created depends on the context of how the autocomplete system 200 is implemented. For example, if the system is to be deployed as part of a corporate environment or as part of a private search function (i.e., searching documents behind the corporate firewall) even if implemented in a larger search engine context, then the corpus of documents can be drawn from documents in the corporate environment. If the autocomplete will be part of a larger search engine service, then the corpus of documents can be drawn from the documents identified and indexed by the search engine service. If the autocomplete system is deployed as part of a bot system, a keyboard system, and/or other input system, etc. then the corpus of documents can be those documents most relevant or most likely to be accessed by or referenced by the bot system, keyboard system, etc.

In a representative deployment, a crawl process 206 identifies documents, such as over a network 208. The crawl process 206 can be a web crawler that accesses and identifies documents. The information gathered can be placed, for example, in a crawl database 204. The gathered information can include a variety of information such as the location of where the document can be found, the type of document, metadata such as title, creator, and so forth as well as other information. In large scale search engines, the number of documents identified in the crawl database 204 can be hundreds of billions of documents.

The short text index 210 can be created from information in the crawl database 204 by a processing and selection process 202. The short text index can be based on a subset of the documents identified in the crawl database 204. The documents that will underlie the short text index 210A, 210B can be selected based on a variety of criteria, depending on the context and the embodiment. For example, documents can be selected based on one or more of:

A likelihood measure indicating how likely the user will be interested in the document;
A document rank measure;
A document visited measure (i.e. how many times a page or document has been visited);
A measure indicating how likely it is the document will be returned in search results;
A storage location of the document (i.e. documents stored in the main area of a corporation may be of more interest than documents stored in a difficult to access area);
How recently the document has been accessed; and/or
Other metrics/measures.

The subset of documents that form the basis of the short text index 210A, 210B can be quite large. For example, in some embodiments, the number of such documents can be 10 billion or more. In a corporate environment, all the documents in the corporation can be included in the subset. Thus, the subset of documents that form the basis of the short text index 210 can be all or a part of the documents identified by the crawl database 204.

Figure 3:
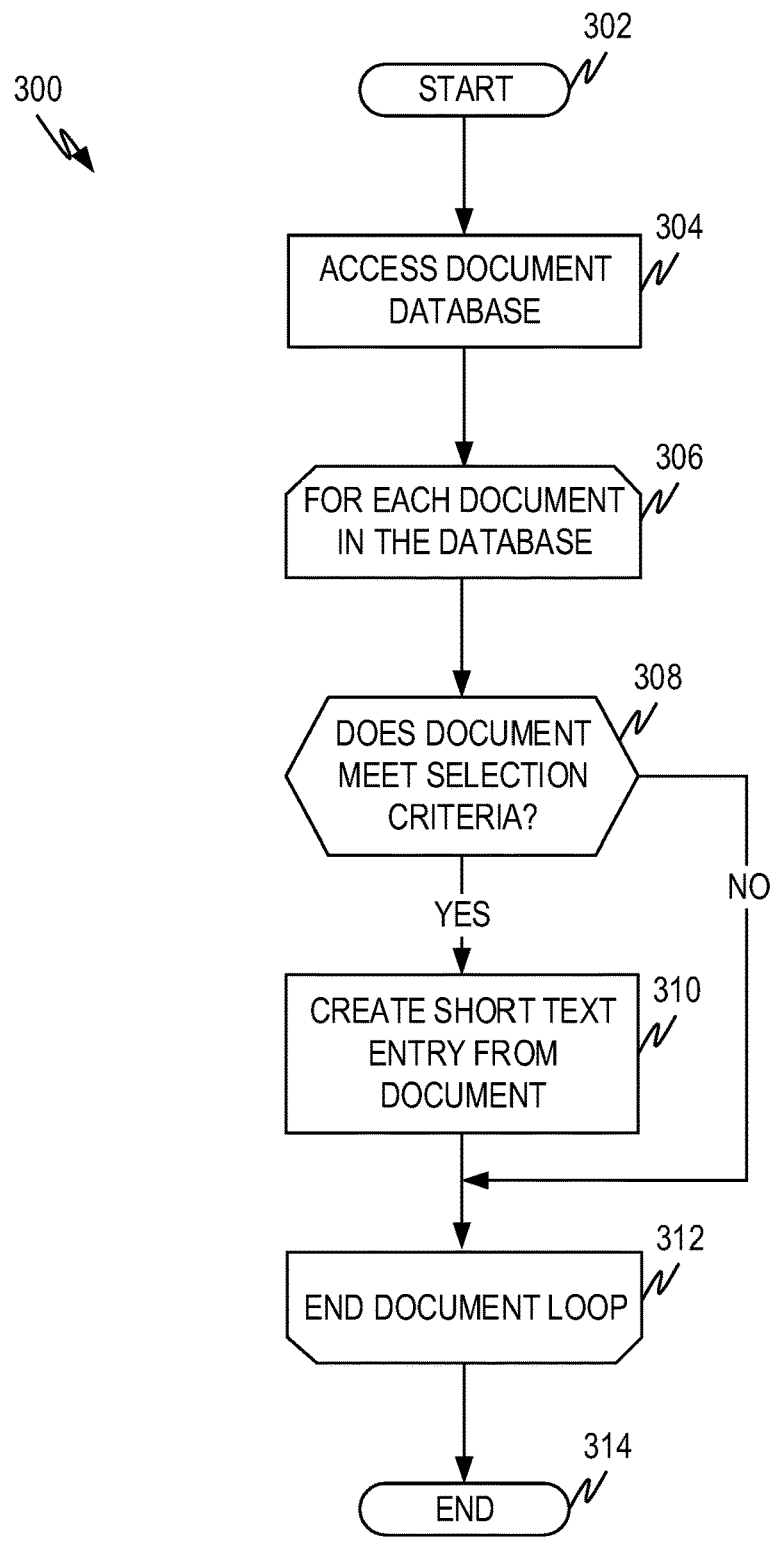
FIG. 3 illustrates a flow diagram for selecting documents to form the basis of the short text index according to aspects of the disclosure.

The processing and selection process 202 sorts through the crawl database (or other database identifying a set of documents) and creates short text entries according to a selection criteria. A representative flow diagram is illustrated in FIG. 3.

The autocomplete system 200 can also comprise a question term index 211. The question term index comprises partial questions and/or question phrases that are found at the beginning of questions. Often well formed questions begin with some variant of a phrase that asks who, what, when, where, why, or how. As representative examples, a question may begin with phrases such as: "tell me about"; "I want to know"; "what is"; and so forth. These phrases can be gathered from questions that users enter, either into the autocomplete system or into another system. For example, search engines publish questions that are received and frequency/probability data associated therewith. The phrases can be gathered and entries made in the question term index 211.

Once the short text index 210A, 210B and question term index 211 have been created, the system is ready to begin accepting questions from the user system 226. The user begins typing or otherwise begins entering a question via the user system 226. This can be as part of a program or app on the user system 226 such as a browser, search dialog box, keyboard, and so forth. As the user enters characters and/or terms they are sent to the index selection process 212. As indicated in the embodiment of FIG. 1, if the user input is not in text format, the user input can be converted to text, via an input conversion process.

A representative index selection process 212 is described below in more detail in conjunction with FIG. 4. However, a summary description of the index selection process is described here.

There are many different ways to identify and select one or more indexes in accordance with aspects of the disclosure. If a sufficient time exists and if the search engine is quick enough, no selection need be performed and all indexes can be searched. Thus, the index selection process 212 will not be used in those embodiments and the entry selection process 213 below will utilize all indexes. However, if such a search process is not quick enough to meet the real time suggestion requirement, then index selection process 212 can select one or more indexes.

In one embodiment of the index selection process 212, an index is selected based on the nature of the terms that are in the question prefix. For example, a list of question terms and/or phrases can be identified and if the question prefix comprises question terms, then the question term index can be added to the list of indexes to be searched. If the question prefix comprises terms that are more "substantive" in nature (i.e., not part of the question terms), then one or more of the short text indexes can added to the list of indexes to be searched. Since question terms generally occur at the start of the question and the substantive terms later in the question, a question prefix that has substantive terms can comprise both the question terms as well as substantive terms. In this case, the appropriate short text indexes would be added and the question term index would not be added (e.g., because the question term part of the question is generally complete once the substantive terms arrive).

Another approach is to keep a list of the terms associated with a particular index and select indexes based on which terms occur in the question prefix. This approach is a generalization of the prior approach. When creating a list of terms associated with a short text index, common stop words can be eliminated. However, with the question term index, the list of terms associated with that index would often include common stop words as they tend to be part of the way questions are formed and eliminating them would not necessarily lead to proper selection of the question term index.

As noted by interactions database 225, prior user interactions can influence the selection of indexes. Use of interactions database 225 is discussed in greater detail below.

Other algorithms can also be used.

Once the indexes that are to be searched have been selected, the indexes are searched by the entity selection process 213. The entry selection process 213 uses the question prefix entered by the user to search the selected indexes via one or more search engines that can search the selected indexes and return results within the required time period to keep the processing of the overall autocompletion loop within the time needed to return "real time" autocompletion suggestions. Real time means that the user perceives the autocompletion suggestions being returned as the question is being entered. This time is referred to herein as the "keystroke" time, although as noted, entry methods other than keystrokes can be used with the system. As noted above, in some embodiments this can be around 100 msec., although that is representative only and is not a fixed number.

The search engine is designed to handle two cases for the end of the question prefix. As a user types in a prefix, the prefix either ends in a partial term or the prefix ends in a break character, such as a space, indicating the last term in the prefix is a whole term. In the first case, the search engine may be expected to match the partial term to many different terms in the indexes 210A, 210B, 211. In the latter case, the search engine may be expected to match whole terms only in the indexes 210A, 210B, 211.

The entry selection process 213 can modify the prefix to indicate which of the two cases the search engine should operate in. For example, if the prefix ends in a partial term, the search engine can append a special character, such as the '*' character to indicate that the final term is partial and that the search engine should match the partial term. If the prefix ends in a whole term, the prefix can remain unchanged, with the possible exception of stripping off the final break character, and the search engine can match whole terms.

The search engine produces a list of entries, with each entry having an associated score. If the index searched is a short text index, the entries returned are short text entries. If the index searched is a question term index, the entries returned are terms/phrases associated with questions (e.g., the forms of who, what, when, where, why, and how discussed above).

The search engine can rank the list in score order using any known ranking method. Prior to ranking, the scores associated with the entries can be adjusted, if desired, based on prior user interactions (i.e., from interactions database 225). User interactions can give guidance as to what aspects the user is interested in and this interest can be used to adjust scores associated with the entries, thus increasing the score for entries that are more likely to be of interest and/or decreasing scores for entries that are less likely to be of interest. This is discussed in greater detail below.

The entry selection process 213 selects the top k entries and passes the entries to the language model generation process 214. The top k entries can be the top k entries of a combined entry list or can be the top k entries in each list returned from an index. The number of entries, k, that are passed to the language model generation process 214 is a matter of tuning the tradeoff between having more entries to construct the language model(s) while staying within the latency bounds of the user keystroke rate. In some embodiments, k falls somewhere between 10 and 200 entries, although these are representative numbers only. The precise value of k can be ascertained for any given embodiment by experimentally increasing and decreasing k until the response time is within the design value for the user keystroke rate and the language mode is complete enough to give satisfactory autocomplete suggestions. Satisfactory autocomplete suggestions are those suggestions that tend to meet user expectations, which can be measured by how often a user picks one of the autocomplete suggestions.

Depending on the size of any index 210A, 210B, 211, the number of selected short text entries, k, represent a small fraction of the total entries in the index 210A, 210B, 211. However, these entries are associated with questions and documents that are closely aligned with the user's prefix in linguistic content, due to the matching process used to extract the entries.

In addition to passing the k short text entries to the language model generation process 214, the entry selection process 213 also passes the prefix to the question completion generator 216.

Figure 6:
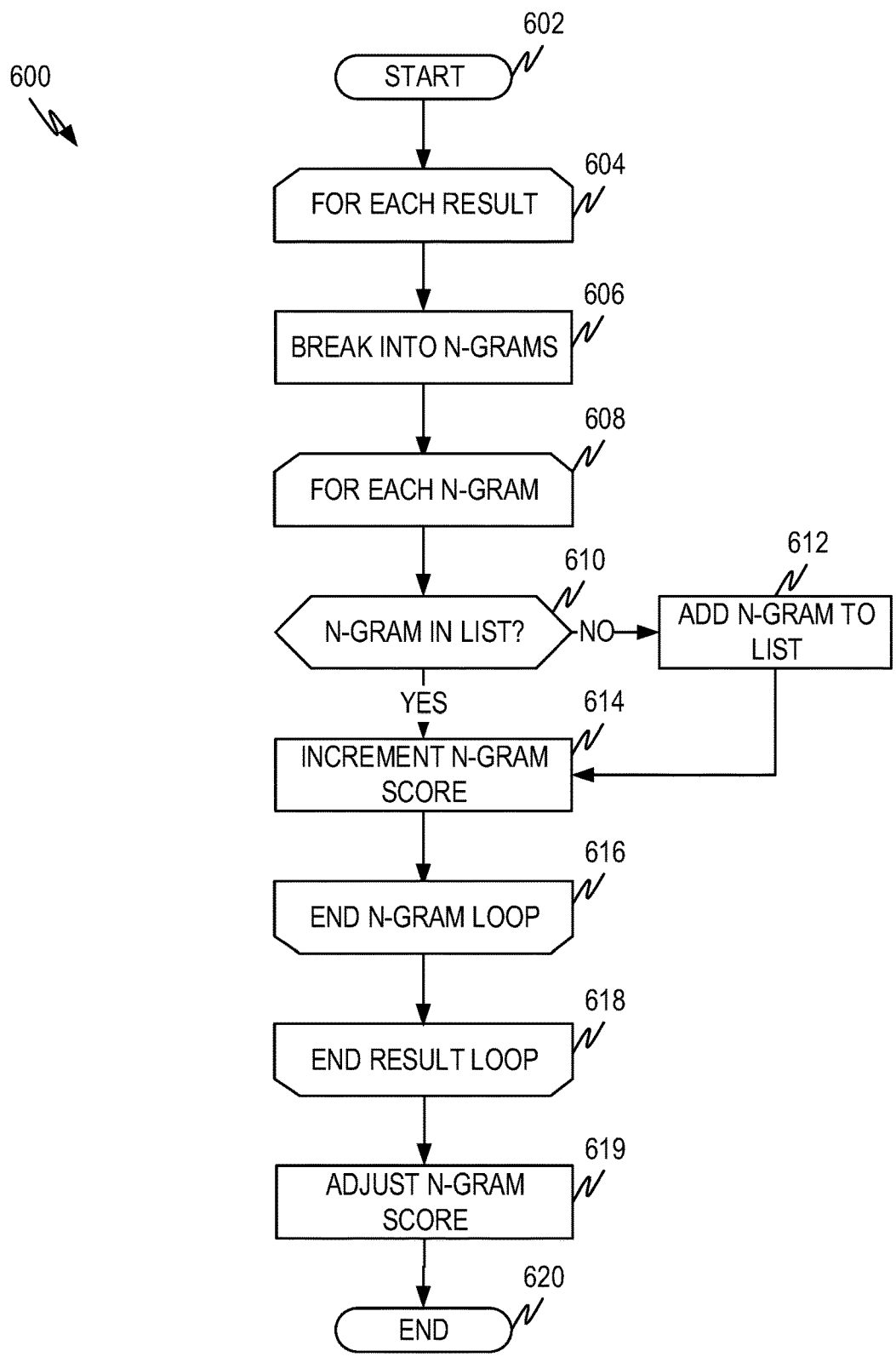
FIG. 6 illustrates a flow diagram for a representative language generation model according to aspects of the disclosure.

Details of a representative language model generation process 214 are described in greater detail in conjunction with FIG. 6. In summary, the language model generation process 214 generates a language model for each list of entries produced by the entry selection process 213. In some implementations, a single language model across all listings is created. In other implementations, a language model is created for the list of entries out of each index. In other words, there is one language model for each index searched. A language model represents a probability distribution over a sequence of words. In this instance, the language model generated by language model generation process 214 represents a probability distribution of the sequence of words in the list of short text entries produced by the entry selection process 213. The single and/or multiple language models are represented by 215 in FIG. 2.

One suitable way of generating the language model is to utilize n-grams from the list of short text entries. For efficiency reasons, the maximum size of the n-grams is typically limed to a relative short number, such as 4 or 5. As in the specific number of entries, k, the maximum length of the n-grams is a matter of tuning the tradeoff between having more entries to construct the language model while staying within the latency bounds of the user keystroke rate. The entries in the list of short text entries are broken down into the various n-grams and a score is associated with each n-gram that represents the probability of occurrence of the n-gram in the list. The n-gram probabilities can also be adjusted based on user interactions (i.e., from interactions database 225) as discussed in greater detail below. FIG. 6 illustrates a representative method.

As a representative example, suppose that the list of short text entries comprises the titles of documents that includes the following:

"the standard patent examination process: timelines and decisions"

"details of the standard patent examination procedure"

High ranking (i.e., more probable) n-grams from the first entry might include:

"patent examination"

"patent examination process"

"patent examination process timelines"

High ranking n-grams for the second entry might include:

"patent application"

"patent application procedure"

These example n-grams will be used below to show sample question completion examples.

Question completion generator 216 receives the language model(s) 215 and the prefix and generates a list of autocomplete suggestions. There are three main phases to creating the list of autocomplete suggestions. These are the insertion point process 218, the candidate removal process 220 and the filter and re-ranking process 222.

Figure 7:
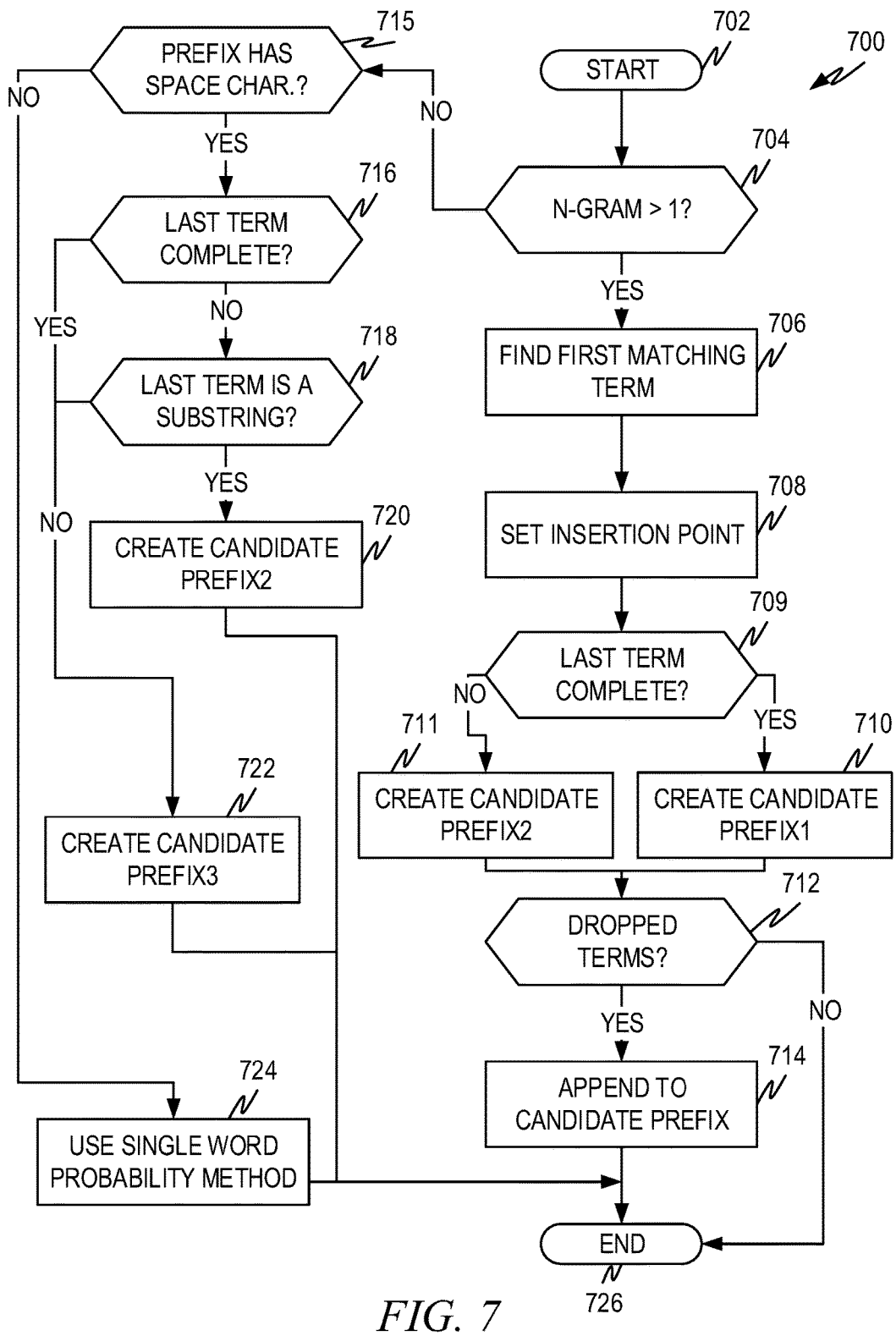
FIG. 7 illustrates a flow diagram for a representative candidate query completion generation method according to aspects of the disclosure.

A representative insertion point process 218 is illustrated in FIG. 7. The insertion point process 218 is performed for the most likely n-grams in the language model. The insertion point process 218 creates a suggestion by merging the prefix and the selected n-gram.

For example, suppose the prefix entered by the user is "standard paten" and the highest ranking n-grams produced by the language model (i.e., from the examples above) include:

"patent examination"

"patent examination process"

"patent examination process timelines"

"patent application"

"patent application procedure"

The insertion process 218 may create from these, autocomplete suggestions of:

"tell me about the standard patent examination"

"tell me about the standard patent examination process"

"tell me about the standard patent examination process timelines"

"tell me about the standard patent application"

"tell me about the standard patent application procedure"

Where the underlined portion represents the prefix entered by the user.

The candidate removal process 220 removes autocomplete suggestions that do not look like questions. Questions, particularly if natural language is used, tends to follow grammar rules. Thus, users entering a natural language question will tend to use standard grammar for the language they are using. Thus, grammar rules can be applied to candidate questions generated by the insertion point process 218 and those that don't comply with accepted grammar rules can be pruned away so they are not shown to the user.

The grammar rules can account for partial questions (i.e., a question prefix that is incomplete). For example, "I want to know about the patent examination process in India and" may not comply with grammar rules for a complete sentence, but it is perfectly fine as an incomplete question. On the other hand, "I want to know and" will not generally comply with even a partial question grammar rules and can thus be removed.

Additionally, or alternatively, prior interactions may indicate candidate questions that can be removed. This is discussed below.

Figure 8:
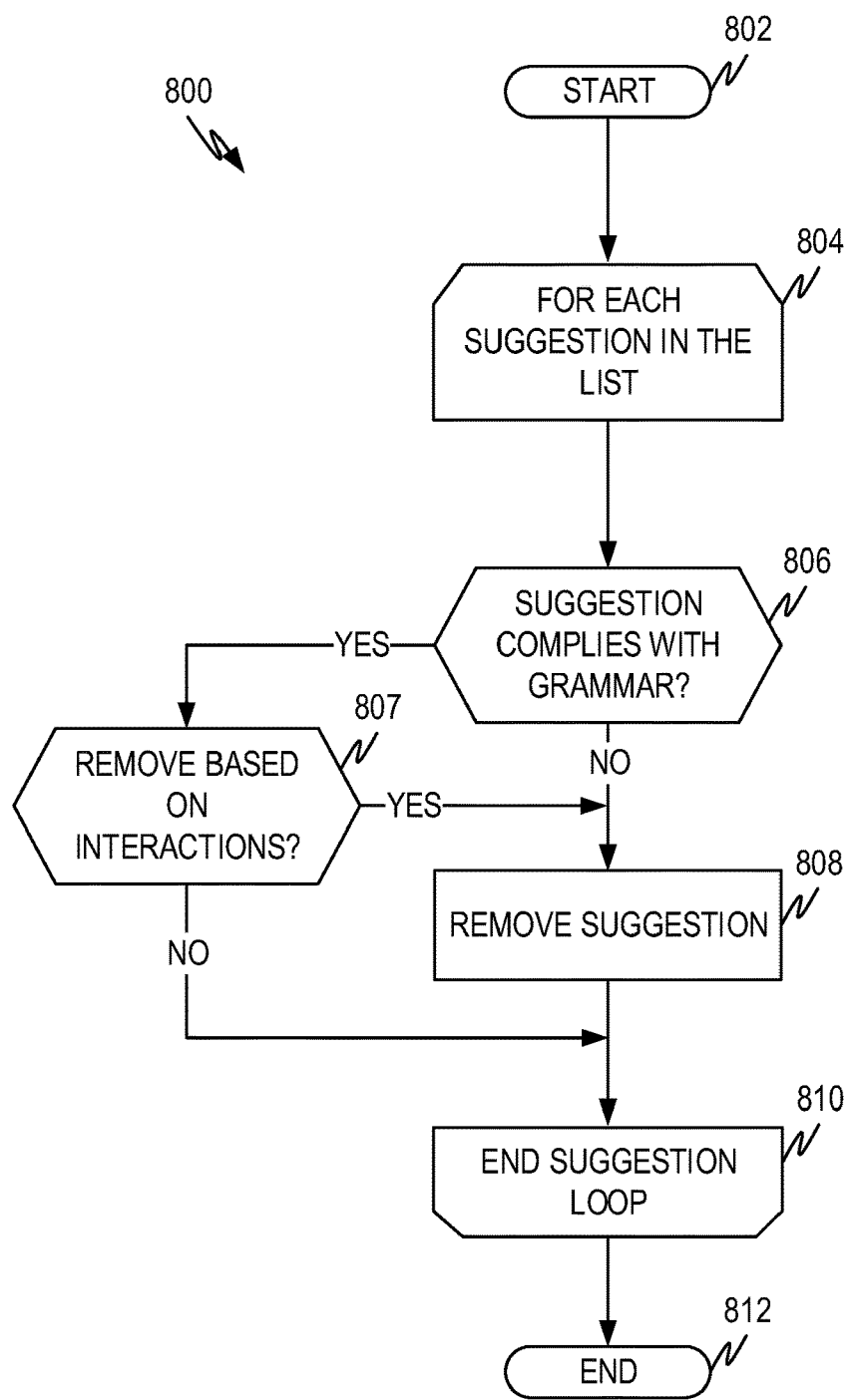
FIG. 8 illustrates a flow diagram for a representative non-query removal method according to aspects of the disclosure.

A representative non-question removal process is illustrated in FIG. 8.

The final operation in the question completion generator 216 is to filter and re-rank the remaining question completion suggestions as illustrated in filter and re-rank process 222. The filter and re-rank process 222 further filters and re-ranks the list of question suggestions based on one or more polices. For example, a policy might state that only one question suggestion should be retained that is derived from each underlying document. Using the examples above, the two documents corresponding to the entries (1) "the standard patent examination process: timelines and decisions" and (2) "details of the standard patent examination procedure" can produce multiple suggestions that are not removed by the candidate removal process 220. As indicated above, these may include:

"standard patent examination"

"standard patent examination process"

"standard patent examination process timelines"

"standard patent application"

"standard patent application procedure"

Where the first three come from document (1) and the last two come from document (2). If the policy states that only one suggestion should be kept from a single underlying document, the above list can be trimmed, only keeping one suggestion for each underlying document. Selection of which suggestion to keep can be based on a variety of other criteria that can come from other policies. For example, a policy may state that suggestions that are longer (i.e., would save the user more typing) should be chosen over suggestions that are shorter. As another example, the inverse may be true (i.e., a policy may state the shorter suggestion should be kept over the longer). As another example, a policy may state to keep the highest scored suggestion (i.e., the suggestion with the highest language model score).

As indicated in the above examples, the ultimate selection can come from a single policy or from the union (or other combination) of multiple polices. In this sense any combination of policies can be used and result in rich selection criteria such as "select if X and Y but not Z".

In addition, prior interactions can be used in the filtering and re-ranking 222 to eliminate, deemphasize and/or emphasize items that are more likely to be of disinterest and/or interest to the user. This is explained below.

The ranking portion of the filter and re-ranking process 222 can be combined with, or separate from, the filtering portion of the process. In other words, the ranking criteria can be independent of or part of the filtering criteria. As an example, the filtering criteria may select the longest suggestion from each underlying entry and the ranking criteria may rank the remaining suggestions according to the n-gram probability. Another example, the filtering criteria may select the longest suggestion from each underlying entry and the ranking criteria may rank the remaining suggestions according to the length of the remaining entries (shortest to longest or longest to shortest). Yet another example may rank the suggestions in alphabetical order. In yet further examples, multiple ranking criteria can be used (i.e., rank first by length then alphabetical or vice versa).

The selection of which ranking rules are to be used may depend on the particular environment. For example, a display screen on a mobile device is typically smaller than that of a tablet or laptop computer. For the former, suggestions that are longer than can be reasonably displayed on the display size may be ranked lower than suggestions that are shorter. Such criteria can also be used in filtering the suggestions (i.e., filter out suggestions that are longer than can be reasonably displayed). The filtering criteria and/or re-ranking criteria can include virtually any type of criteria.

In some embodiments, the filtering and re-ranking process 222 also limits the number of suggestions passed to the truncate and formatting process 224. For example, the list can be limited to 20 suggestions in one embodiment. In other embodiments, fewer than 20 or more than 20 suggestions can be used. In still other embodiments, the filtering and/or ranking criteria does not limit the list to a particular number of suggestions and passes all that meet the filtering criteria to the truncate and formatting process 224.

Once the list of suggestions has been filtered and re-ranked according to the desired criteria, the remaining suggestions are passed to truncate and formatting process 224. This process truncates the list of suggestions to the appropriate number for the user system 226, keeping only the top n, suggestions. The number of suggestions, n, is set based on the environment. For example, if the user system 226 is a mobile device, the truncate and formatting process 224 may keep only the top four suggestions. As another example, if the use system 226 is a laptop, desktop or tablet, the truncate and formatting process 224 may keep the top eight suggestions. Communication bandwidth (i.e., between the user system 226 and the autosuggestion system) can be used to set n, with more suggestions being returned on higher bandwidth connections and fewer on lower bandwidth connections. Selecting n is a tradeoff between the number of suggestions that can reasonably be displayed on user system 226 and the time it takes to transfer and display the suggestions.

Whether truncate and formatting process 224 formats the suggestions depends on whether formatting is performed on the autosuggestion side or on the user system side of the communication link. For example, if the suggestions are formatted by an app on the user system 226, the truncate and formatting process 224 need only send down the suggestions in a format that the application understands and leave the UI formatting to the app. If, however, the formatting is performed on the autosuggestion side, such as by an HTML document and/or snippet, then the truncate and formatting process 224 can create the appropriate HTML. As yet another example, the truncate and formatting process 224 can pass the suggestions to yet another component that formats the suggestions prior to sending the suggestions to the user system 226.

Interactions database 225 comprises information about prior user interactions that are useful to the various processes discussed above. The interactions database 225 comprises the interaction data associated with the user and the specific conversation and/or the interaction data of the user with regard to suggestions. Thus, if a final question is submitted and the user subsequently decides to enter a follow-up question, these subsequent conversations can also be observed and recorded. Thus, interaction data of interaction database 225 can comprise one or both of two types of tuples:

1. Incomplete question prefix, suggestions shown, suggestions skipped|hovered|selected.
2. Complete question, response shown (i.e., by the system that is the recipient of the complete question).

This implies that the interaction database 225 can comprise as many instances of 1 as there were keystrokes in the complete question, for each question. This also implies that the interaction database 225 can comprise as many instances of 2 as there were question-response pairs in the entire conversation to date.

The interaction data in the interaction database 225 is accessible to all parts of the autocomplete system 200. The decisions by the user to select or to ignore (skip) specific suggestions, and the text of the complete question and response can be used to influence actions such as:

Which indexes are selected (i.e., by index selection process 212);
Searching the selected indexes (i.e., by entry selection process 213);
The language modelling generation process (i.e., process 214)
The question completion generator 216 (especially the filtering and re-ranking process 222)

Let us consider an example question prefix, "tell me about eagles". The term "eagles" is a highly ambiguous term and might readily refer to:
A band
A sports team
A kind of bird
A type of score in golf So the question suggestion system might offer question completion suggestions as follows:
Tell me about the eagles band
Tell me about Philadelphia eagles
Tell me about eagles birds of prey
Tell me about albatrosses eagles birdies Assume the user selects "Tell me about eagles birds of prey". The interactions database 225 records that action, and also that the user skipped the "eagles band" and "Philadelphia eagles" suggestions in order to select the "birds of prey" suggestion.

The response is passed to a search engine or other program/application/system that provides a response. Suppose the response shown to the user is something like:

"Eagles are large, powerfully built birds of prey, with heavy heads and beaks. Even the smallest eagles, such as the booted eagle (*Aquila pennata*), which is comparable in size to a common buzzard (*Buteo buteo*) or red-tailed hawk (*B. jamaicensis*), have relatively longer and more evenly broad wings, and more direct, faster flight—despite the reduced size of aerodynamic feathers. Most eagles are larger than any other raptors apart from some vultures."

The interactions database 225 records this response as well. In terms of modelling user intent, the user is currently positively engaged in a "Birds|Animals|Natural Environment" conversation, and negatively engaged in sports and music. Thus, if the user subsequently starts typing another question, "tell me about hawks". Like "eagles" of the prior question, the term "hawks" is another highly ambiguous term and might readily refer to:
Several sports teams
A movie
A place in Ohio
A kind of bird The suggestions produced by the system 200 might include:
Tell me about Hawthorn hawks
Tell me about hawks movie
Tell me about hawks ohio
Tell me about hawks birds of prey By performing a textual similarity match between these suggestions and the interaction and question-response data in the interactions store, the most likely suggestion will be "tell me about hawks birds of prey". Since the interaction data also indicates that there is negative sports intent, it might also be possible to infer that the sports suggestion is least likely. Consequently, the filter and re-ranking process 222 could re-order the suggestions to show:

Tell me about hawks birds of prey
Tell me about hawks movie
Tell me about hawks ohio
Tell me about Hawthorn hawks The system can also use sophisticated query modification and feature modelling methods which would be available to the other activities of the system (index selection process 212, entry selection process 213, language model generation process 214, candidate pruning process 220, etc.) as mentioned earlier and/or as discussed below.

FIG. 3 illustrates a representative flow diagram 300 for selecting documents to form the basis of the short text indexes (i.e., indexes 210A and 210B) according to aspects of the disclosure. The method begins at operation 302 and proceeds to operation 304 where the method accesses the document database from which the basis of the short text indexes 210A, 210B is to be created. As discussed above, the document database can be the result of a web crawler (and/or other crawler) which can collect metadata about documents.

Operations 306 to 312 form a loop that loops over each document in the database.

Operation 308 identifies whether the document under consideration meets the selection criteria. As discussed above, the selection criteria can include, but is not limited to, one or more of:

A likelihood measure indicating how likely the user will be interested in the document;
A document rank measure;
A document visited measure (i.e. how many times a page or document has been accessed/visited);
A measure indicating how likely it is the document will be returned in search results;
A storage location of the document (i.e. documents stored in the main area of a corporation may be of more interest than documents stored in a difficult to access area);
How recently the document has been accessed; and/or
Other metrics/measures.

Selection can be made when a score exceeds a threshold. The score can be any of the above measures/metrics, a combination of the above measures/metrics (i.e., combined into a single score as with a weighted sum or weighted average), and/or multiple of the above measures/metrics in any combination (i.e., metric A is above one threshold and metric B is below another threshold, etc.).

If the document meets the criteria (i.e., the "YES" path out of operation 308), the method creates an entry in the short text index from the document in operation 310. Entries in the short text index comprise descriptive text and a score. The score can be any rank, measure, a-priori probability, etc. that indicates a score or ranking of the entry. For example, the score can be the metric associated with the selection criteria. In one example the score can be the score of the selection criteria. For example, if documents are selected based on how recently a document has been accessed, the score can be derived in a way that represents how recent the date of access has been. As another example, if the document is selected based on the number of times the document has been accessed/visited, then the score can be derived from the number of times the document has been accessed/visited. In another example, the score can be different from the selection criteria. For example, documents may be selected based on page rank but scored in the short text index according to one or more selected criteria. Any one or more of the above selection criteria can be the score, either singly or combined in some fashion, such as through a weighted sum or weighted average.

The descriptive text for the short text index can be derived from the document, as previously described. In one example, the title of the document is used as the descriptive text. In other examples, other summaries or abstracts of the documents are used. The descriptive text is relatively short in length, much shorter than the underlying documents represented by the individual entries. In some embodiments, the short text entries are no longer than about 10 to 15 words in length. In other embodiments, the short text entries are no longer than about 20 to 40 words in length. In yet another embodiment, the short text entries are no longer than about 100 words in length. This should not be taken to imply that all entries in the index need to have the same length of descriptive text, although that is certainly possible. These lengths typically represent an upper limit on the length of the descriptive text.

The longer the text entries, the longer it can take the search engine to search through them and return matching entries. Thus, the length of the descriptive text in the short text index entries represents another tradeoff that can be made when tuning the system to ensure operation within the keystroke time of the user.

Operation 312 is the end of the loop over the documents. After all documents have been examined for inclusion into the short text index, the method terminates in operation 314.

The question term index can be created from questions that have been entered by the user in a system. Thus, search engines can track questions entered by the user and the questions can be examined and the substantive aspects removed to identify the portion of the questions that form the question aspects of the question prefix. Thus, a question such as "tell me about eagles" can be examined and the object of the question (i.e., "eagles") can be removed leaving the question aspect of the question prefix. Thus, a grammatical examination of a question will yield objects and other grammatical constructs that can be removed from the question leaving the prefix that can be used as an entry in the question term index.

Figure 4:
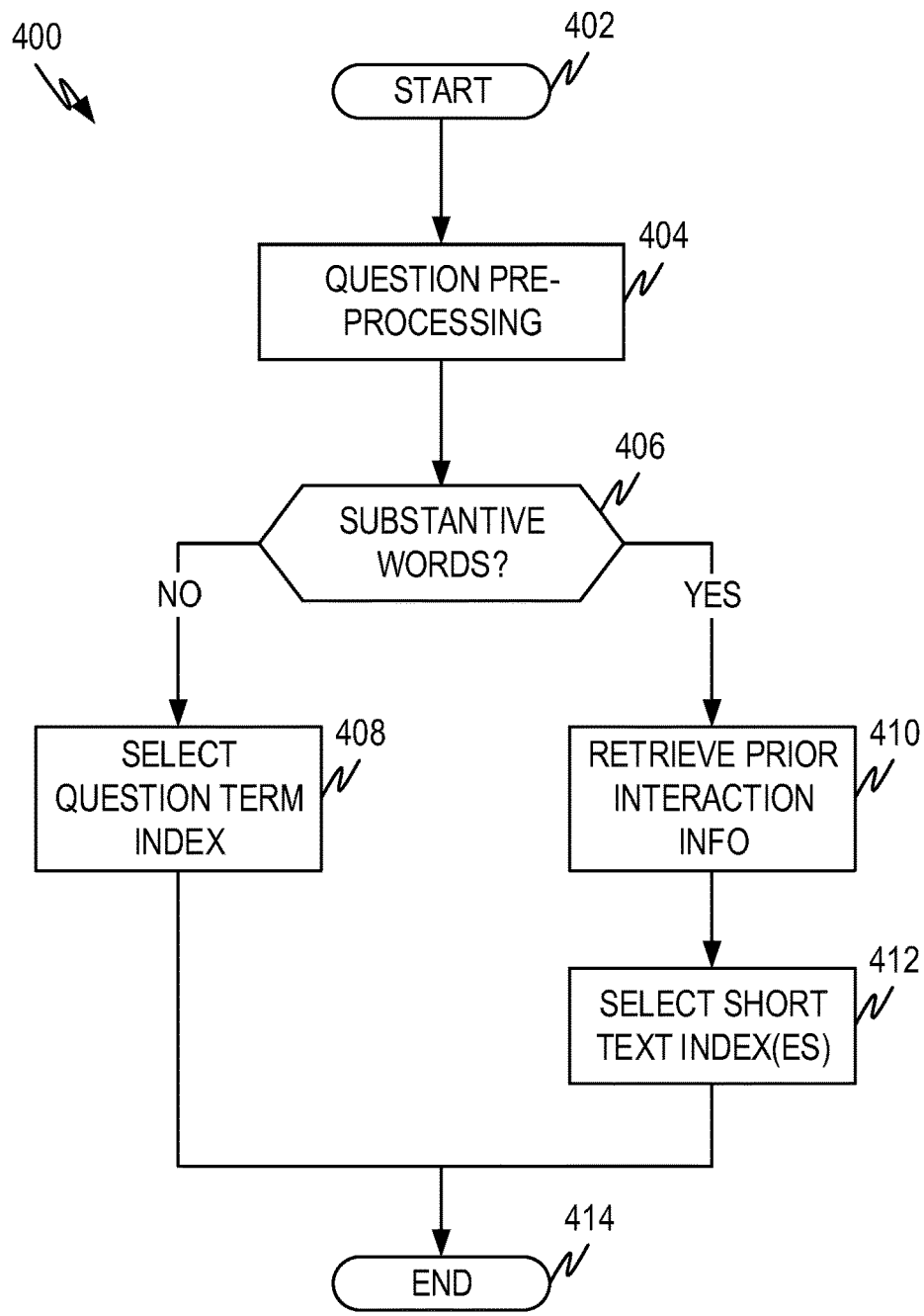
FIG. 4 illustrates a flow diagram for selecting an index according to aspects of the disclosure.

FIG. 4 illustrates a flow diagram 400 for selecting an index according to aspects of the disclosure. The flow diagram illustrates selecting an index based on whether the question prefix contains substantive terms or only terms that would be associated with the initial portion of a question (i.e., the phrase variants that include some form of who, what, when, where, why and how).

The flow diagram begins at operation 402 and proceeds to operation 404 where any question pre-processing is performed. For example, the whole (i.e., complete) terms of a query prefix can be spell checked to eliminate spelling errors. Other pre-processing may also be performed in order to correct obvious mistakes and/or put the question in a better form for processing.

Operation 406 tests whether the question prefix includes substantive terms or only terms that the beginning phrases of a question (i.e., the phrase variants that include some form of who, what, when, where, why and how). This can be tested in a couple of ways. First the presence of the phrase variants can be tested and subtracted from the question prefix. If what remains is only stopwords, then no substantive terms are in the question prefix. On the other hand, if, after removing the phrase variants and stopwords terms remain, they can be substantive terms. In the alternative, a list of stopwords can be created that include the terms in the phrase variants (i.e., some form of who, what, when, where, why and how) and the question prefix tested to see if it contains only stopwords or contains something else. In this case, the non-stopwords will be substantive terms.

If the phrase only contains stopwords and/or the phrase variants, then the "NO" branch is taken and the question term index can be added to the indexes to be searched. If the phrase contains substantive terms, the "YES" branch is taken to operation 410 where the interaction information (i.e., from interaction database 225) is retrieved. As explained above, if the current question prefix is a follow on from a prior question context, the prior question context can identify index(ex) that should be added to the list of indexes to be searched. The example presented above, is that the prior question was "tell me about eagles birds of prey" and the current prefix is "now tell me about hawks," the prior topic of engagement (i.e., birds, nature, etc.) is the likely context for the follow-on question prefix and the appropriate index can be selected accounting for the prior question context (i.e., by operation 412).

Whether the current question prefix is a follow-on from the prior question context can be tested in a variety of ways. In one example, the system can always add the index associated with the prior question context to the search list or the system can add the index associated with the prior question context if the terms in the question prefix are otherwise compatible with the prior question context. For example, if the prior question context was birds, but the current question prefix contains no terms related to birds, the current question prefix is likely not associated with the prior question context. Thus, the terms associated with an index can be compared to terms associated with the prior question context to identify matches and, based on the matches, the index for the prior question context can be included (or not if there are no matches).

Execution proceeds to operation 412 where the short text index(es) are selected, based on the prior question context and/or the current terms in the question prefix. As discussed above, different methods can be used to select the short text index(es). If there is only one short text index, the choice is to select the one short text index. However, if multiple short text indexes exist, then the index can be selected based on a frequency of terms associated with each index, based on the occurrence of a term in the question prefix in an index, and so forth. If the system is fast enough, all short text indexes can also be searched.

The method ends at operation 414, where the list of index(es) to be searched is provided to the entry selection process (i.e., 213).

Figure 5:
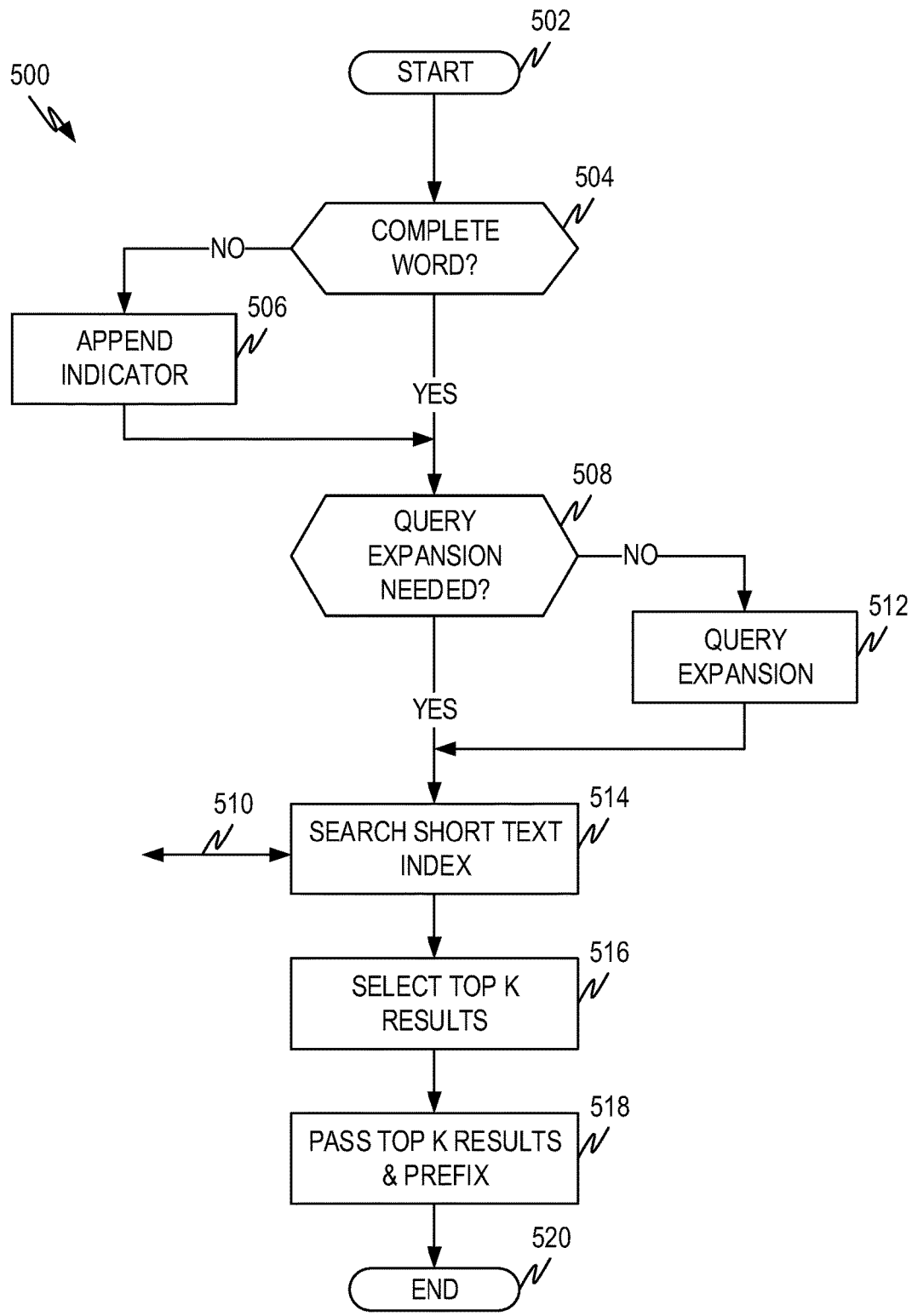
FIG. 5 illustrates a flow diagram for a representative short text selection method according to aspects of the disclosure.

FIG. 5 illustrates a flow diagram 500 for a representative short text selection method according to aspects of the disclosure. The method 500 illustrates how a single index can be searched. Thus, if multiple indexes are searched, the method 500 would be performed for each index searched.

The method begins at operation 502 and proceeds to operation 504 where the system identifies whether the last word in the prefix is a complete word. As discussed above, the last term in a prefix is either complete or incomplete. Complete terms can be identified by the presence of a break character (space, punctuation mark, etc.).

If a break character is the last character in the prefix, the last term in the prefix is complete (the "YES" branch from operation 504) and execution can proceed to operation 508. If desired, before proceeding to operation 508, the method can strip the break character from the prefix.

If a break character is not the last character in the prefix, the last term in the prefix is a partial term (the "NO" branch from operation 504) and execution proceeds to operation 506 where a character is appended to the prefix to let the search engine know that the last term is a partial term and that the search engine should perform partial matching on the term. Any character can be used as long as it signals to the search engine to perform partial term matching. A common wildcard character is the '*' or '?' character and so one of these characters can be utilized. Thus, a user entering "ten" with no break character will have an appended '*' by operation 506 and "ten" will be converted to "ten*" indicating the search engine should allow the prefix (ten*) to match "tender," "tense," "tent," "tentacle," and so forth.

After the character is appended in operation 506 of if the last term is complete, execution proceeds to operation 508 where the method identifies whether the predicted results will be sufficient (i.e., whether query expansion is needed). As previously explained, there is a tradeoff between having a sufficient number of entries to create a language model that works well and not having too many entries. Thus, the search engine should produce at least the number of entries (i.e., k entries) that are going to be used to produce the language model. Thus, in operation 508 the number of expected entries returned can be compared to a threshold and if the number equals or exceeds the threshold, the "YES" branch is taken as there are enough results to proceed. The threshold can be set at k or can be higher or lower than k. Determining whether enough results are expected to be returned can be based, for example, on the number of terms in the query (more terms in the prefix can correlate to fewer results), or based on some other criteria such as the number of search results actually returned from the same/similar query in past query completion operation.

If there are insufficient predicted results to create a good language model, the "NO" branch is taken to operation 512 where the prefix is modified to return more results. There are several known methods to broaden a query to return more results and any of these methods can be used, either alone or in combination. For example, terms in the prefix can be stemmed (i.e., replaced with a root term), terms can be dropped from the prefix, and so forth. However, as a query is broadened, search results that are less relevant to what the user is looking for can be introduced. Thus, care can be taken to broaden the query only enough to get sufficient results from the short text index.

If sufficient results are predicted, or after query expansion operation 512, execution proceeds to operation 514 which searches the short text index using the prefix. As noted above, the search engine is tuned to search the short text index and return results within the required time period to keep the processing of the overall autocompletion loop within the time needed to return "real time" autocompletion suggestions. Real time means that the user perceives the autocompletion suggestions being returned as the question is being entered.

As previously discussed, the search engine returns a ranked list of results (i.e., results where each entry comprises a score that can be used for ranking). The score can be used as given from the search engine or the scores can be adjusted or recalculated in some fashion before the search engine returns the scores to the method in operation 514. For example, the a-priori scores associated with the search results can take into account things like page rank, storage location, access time, and so forth. However, the scores can be recalculated and/or adjusted for things the search engine discovers during the searching process. For example, if an entry has a direct match with the prefix the score can be higher than if an entry has a match that is not direct (either because the term matches a stem, different term order, and so forth). Thus, the type of match can be used to either set the score or adjust the a-priori scores.

When a sufficient number of results has been obtained and ranked according to the score (if the results to not come pre-ranked from the search engine), the method selects the top k results in operation 516. Operation 516 can also receive information from the interactions database (i.e., 225 of FIG. 2) as indicated by arrow 515 that can help rank and select the top k results. As previously discussed, prior interactions may indicate how the retrieved entries should be ranked and/or selected. Using the example above, if prior interactions shows that a user is positively engaging on the topic of birds, the entries relating to birds can be ranked higher than other entries. Similarly, if a user has skipped engaging on sports/sports teams, those can be ranked lower. The rankings help drive more likely entries to the top of the list and less likely entries lower in the list.

The number of entries, k, that are passed to the language model generation process 214 is a matter of tuning the tradeoff between having more entries to construct the language model while staying within the latency bounds of the user keystroke rate. In some embodiments, k falls somewhere between 10 and 200 entries, although these are representative numbers only. The precise value of k can be ascertained for any given embodiment by experimentally increasing and decreasing k until the response time is within the design value for the user keystroke rate and the language mode is complete enough to give satisfactory autocomplete suggestions. Satisfactory autocomplete suggestions are those suggestions that tend to meet user expectations, which can be measured by how often a user picks one of the autocomplete suggestions.

The k selected entries are then passed to the language model generation process and the prefix is passed to the question completion generator in operation 518 and the method ends at operation 520.

FIG. 6 illustrates a flow diagram 600 for a representative language generation model according to aspects of the disclosure. This is a representative method that uses n-grams to create the language model. Other language models can also be utilized with embodiments here. Furthermore, if multiple indexes are searched, multiple language models can be created, one for each index searched using the entries retrieved from that index. In the alternative, all entries can be combined into a single language model. When multiple language models are produced, the method 600 can be executed for each language model to be produced.

Execution begins at operation 602 and proceeds to operation 604. Operations 604-518 represent a loop across all results returned from the search engine. Thus, if the search engine returns 100 results, the loop will execute across all 100 results.

Operation 606 breaks the entry under consideration into n-grams up to the maximum limit. In breaking the entry into n-grams, some embodiments drop noise words like "the," "and," and so forth. Lists of such noise words are readily available and can be tuned to any particular application with reasonable inquiry. For example, if the entry was "standard patent examination process: timelines and decisions" and the n-gram limit were three (i.e., a 3-gram), the n-grams produced would be:
1-Grams:
standard
patent
examination
process
timelines
decisions
2-Grams:
standard patent
patent examination
examination process
process timelines
timelines decisions
3-Grams:
standard patent examination
patent examination process
examination process timelines
process timelines decisions Operation 608 represents the beginning of a loop (operations 608-516) across all the n-grams created for the entry under consideration. In operation 610, the system tests whether the n-gram under consideration exists in the list. If so, (the "YES" branch), the score for the n-gram is incremented (operation 614). If not, (the "NO" branch) the n-gram is added to the list and the score incremented (operation 614).

Operation 616 closes the n-gram loop and operation 618 closes the result loop. This flow diagram will result in each n-gram in the list having a minimum score of 1 and a maximum score equal to the number of times the n-gram exists in the list of entries. If desired, after all scores are calculated (i.e., after all entries have been processed), the scores can be normalized by the number of entries, by the maximum score, or by some other factor. This operation is not shown in FIG. 6.

Once the n-grams have been scored, data from the interaction database (i.e. 225 of FIG. 2) can be used to adjust the n-gram scoring if desired. Thus, operation 619 represents scoring adjustment based on past interaction data. If a user has skipped interacting with completions that are represented by some n-grams, the n-gram score for those n-grams can be adjusted downward to represent the user interaction data. Similarly, n-grams that are part of an ongoing dialog can have scores adjusted upward. Adjustments can be based on similarity to the interaction data so that the more similar the n-gram is to the interaction data the more the score is adjusted upward or downward. One possible technology to achieve this outcome is to use a separate ranking model in operation 619, that learns how much additional weight to assign to items that have higher similarity to the past iteration data. Such a ranking model can be created using "Learning to rank" technology that is well established in both research literature and publicly available toolkits. The existing ranking, and the additional similarity scores, are provided to this separate ranking model which outputs new scores for each item, and then the entire list is re-ordered according to this new score.

The method ends at operation 620.

FIG. 7 illustrates a flow diagram 700 for a representative candidate question completion generation method according to aspects of the disclosure. The method is executed to generate candidate question completion suggestions (also called autocompletion suggestions). The method combines the prefix with the n-grams produced by the language model to generate the autocompletion suggestion candidates and is executed, for example, by the insertion point process 218. As previously discussed, the language model process produces a language model that has a plurality of n-grams along with a score, indicating the frequency of occurrence (i.e., probability of occurrence) of the n-gram in the short text entries selected by the short text selection process. The method can be executed on a subset (i.e., all or part) of the n-grams produced by the language model. In one embodiment, the method is executed on n-grams with a score higher than a given threshold. In another embodiment, all n-grams are used. Although the method 700 is generally executed for multiple n-grams, the discussion below illustrates how the process works on an n-gram. A loop would be created to execute the process across all selected n-grams.

The process begins at operation 702 and execution proceeds to operation 704 where the method tests whether n-gram is a 1-gram or greater than 1-gram (i.e., 2-gram, etc.). If the n-gram is more than a 1-gram, execution proceeds along the "YES" branch to operation 706.

Operation 706 identifies the first matching term in the prefix that matches the first term in the n-gram. If the final term of the prefix is incomplete, then matching the first term includes substring matches. The result of operation 706 can be one of two situations. Either operation 706 found a matching term or it didn't find any matching terms. Thus, if the prefix is "standard patent" and the n-gram was "patent examination procedure," the first matching term would be "patent". If the prefix was incomplete (i.e., "standard pat"), then the first matching term would be where the substrings matched (i.e., "pat"). On the other hand, if the prefix is "standard patent" and the n-gram is "examining procedure," then there are no common matching terms.

Operation 608 sets the insertion point to the matching term. The insertion point is the point at which the n-gram is merged into the prefix. If there are no matching terms, the insertion point is set to the end of the prefix. If a matching term was identified, the insertion point is the position of the first matching term identified in operation 706. In the above examples, the insertion point is placed at the beginning of the matching term "patent" for the first example (prefix="standard patent" and n-gram="patent examining procedure") and at the matching term "pat" for the partial word example (prefix="standard pat" and n-gram="patent examining procedure". For the example where there is no matching terms, the insertion is set at the end of the prefix (prefix="standard patent" and n-gram="examining procedure").

Operation 709 tests whether the last term is complete. If so, the candidate prefix is created by the method described in operation 710 below (i.e., candidate prefix=candidate prefix1). If the last term is not complete (i.e., a partial term), then the candidate prefix is created as described in operation 711 below. (i.e., candidate prefix=candidate prefix2).

If the last term is complete, a candidate prefix is then created in operation 710. The candidate prefix created by operation 710 is labeled candidate prefix1 in the diagram so that it can be distinguished from the way other candidate prefixes are created in the method. The candidate prefix of operation 708 is created by taking the substring of the prefix from the starting character to the insertion point, adding a space, and adding the n-gram and placing a space at the end. In other words if substring=substring of the prefix from the starting character to the insertion point, then:

Candidate prefix1=substring+space character+gram+ space character.

In other embodiments, the last space character can be removed.

If the last term is incomplete, a candidate prefix is then created in operation 711. The candidate prefix created by operation 711 is labeled candidate prefix2 in the diagram so that it can be distinguished from the way other candidate prefixes are crated in the method. The candidate prefix of operation 711 is created by removing the partial term and taking the substring of the prefix from the starting character to the insertion point, adding a space, and adding the n-gram and placing a space at the end. In other words, if partial term=the partial matching substring of the prefix (i.e., at the insertion point), then:

Candidate prefix2=(prefix−partial term)+gram+space character.

In other embodiments, the last space character can be removed.

Once the candidate prefix1 is created, operation 712 identifies whether there are dropped terms from the prefix. These dropped terms can arise, for example when the first matching term is not at the end of the prefix. For example, if the prefix is "standard patent procedure" and the n-gram is "patent examination" then operation 708 sets the insertion point at "patent" in the prefix and the substring of the prefix is "standard" Candidate prefix would then be calculated as "standard patent examination"="standard"+space+n-gram+ space. The term "procedure" has been dropped from candidate prefix.

If dropped terms are identified in operation 712, the "YES" branch leads to operation 714 where the dropped terms are appended to the candidate prefix1. Thus, in the above example, the candidate prefix would be "standard patent examination" plus the dropped term "procedure" yielding candidate prefix="standard patent examination procedure".

If there are no dropped terms, the "NO" branch leads to operation 726 and the candidate prefix would be equal to the calculated candidate prefix.

For 1-grams, the "NO" branch out of operation 704 leads to operation 715 where the last term of the prefix is tested to see if it contains a space character. If the prefix contains a space character, the prefix has at least one complete term. If there is not at least one complete term (i.e., is a single partial term), then the "NO" branch leads to operation 724 where a different method of dealing with the gram is used. This different method can be, for example, a single word probability method. It is often more effective to utilize a method that includes the single word probability of the gram across a larger language model. In this method, the n-gram will be appended to the prefix if the probability that the n-gram follows the prefix is greater than a threshold probability. In the alternative the 1-gram probability for the existing language model can be utilized.

If the prefix has a space character (i.e., at least one complete term), the "YES" branch leads to operation 716 where the last term in the prefix is tested to see if last term is complete. If the last term is not complete (i.e., a partial term) the "NO" branch leads to operation 718 where the last term is tested to see if it is a substring of the gram.

If the last term is not complete and if the last term is a substring of the gram, then the candidate prefix is calculated as prefix2 (operation 720). In other words, candidate prefix=candidate prefix2=(prefix−last term)+gram.

Otherwise, if the last term is complete or if the last term is not a substring, the candidate prefix is calculated as prefix3 (operation 722). In other words, candidate prefix=prefix3=prefix+gram.

Execution Ends at Operation 726.

FIG. 8 illustrates a flow diagram 800 for a representative non-question removal method according to aspects of the disclosure. The method is executed, for example, by candidate pruning process 220. As discussed above, the method removes autocomplete suggestions that do not look like questions.

Execution begins at operation 802 and proceeds to operation 804. Operations 804-810 represent a loop across each suggestion in the list of candidate question suggestions, i.e., that are created by the method illustrated in FIG. 7.

As discussed above, embodiments can test whether a suggestion does not conform to grammar rules for a question, particularly when natural language is used. For example, questions do not usually begin with a conjunction. Thus, grammar rules can comprise a mix of rules and/or stopwords. The rules can identify locations within the candidate suggestion that stopwords should and/or should not appear and indicate removal of the candidate suggestion when they do.

Operation 806 tests whether the suggestion under consideration complies with the grammar rules. To avoid autocomplete suggestions that seem "unquestion like" to the user, the stopword list can include stop words, dangling terminators and other words that would not generally terminate a question or a partial question (i.e., question prefix). A representative list of stopwords can comprise prepositions (e.g., until, by, into after, from, etc.), articles (e.g., a, an, the, and, etc.) and other words that would generally not terminate a question (his, her, their, how, why, where, when, which, etc.) and other words that would not usually be found at the beginning (or end) of a question. Some of these can start a question and be just fine, so the stopword list of operation 806 can allow stopwords that would be seen as "question like" should they begin a question. Rules can then be applied to the stopwords to remove suggestions that have stopwords in ungrammatical locations.

In addition, other grammar rules can be applied to eliminate ungrammatical suggestions. If a candidate is constructed from the prefix "what is the" and "for me" to form the candidate "what is the for me," the candidate lacks a noun phrase following "the" and is ungrammatical and can be removed. On the other hand, a candidate of "what is the best computer for me" would be perfectly fine and is grammatical.

When the suggestion complies with the grammar rules (i.e., is not marked for elimination based on the rules and/or stopwords and rules above), the "YES" branch out of operation 806 is taken to operation 807, where the interactions data is used to test whether the candidate should be removed as described below.

If the suggestion under consideration does not comply with the grammar rules and/or stopwords and rules, the "NO" branch leads to operation 808 where the suggestion is removed from the list of suggestions and the next suggestion is considered (operation 812).

The interaction data from the interactions database can also be used to identify candidate suggestions that should be removed (the "YES" branch). This is described above, where candidate suggestions that are not part of the current context can be removed. This is illustrated by operation 807 which tests whether the candidate suggestion should be removed based on past interactions. In the alternative, candidate removal can be removed by the filtering and re-ranking process 222 at a later stage.

After all suggestions have been considered, execution ends at operation 812.

Example Machine Architecture and Machine-Readable Medium

Figure 9:
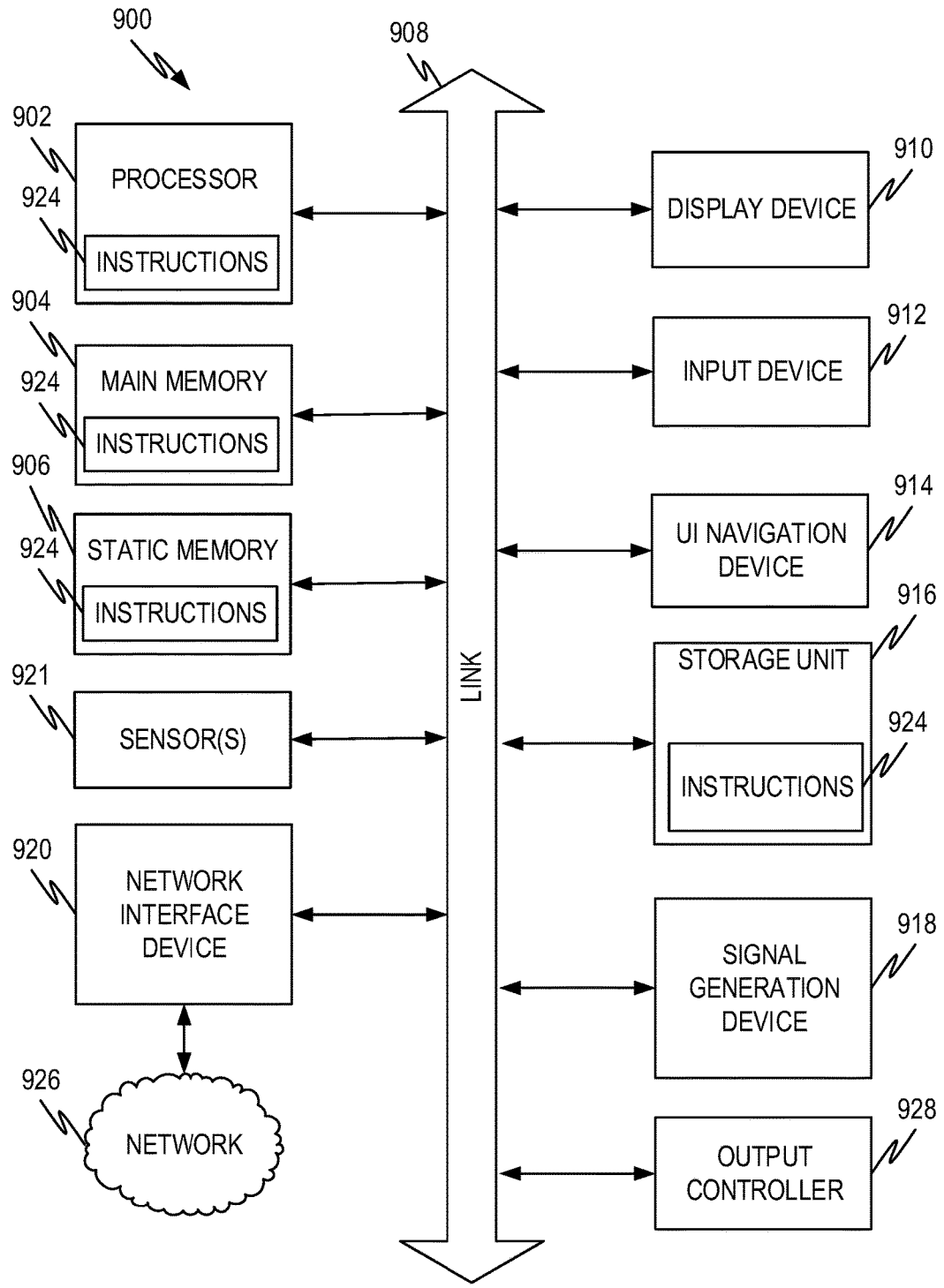
FIG. 9 illustrates a representative machine architecture suitable for implementing the systems and other aspects disclosed herein or for executing the methods disclosed herein.

FIG. 9 illustrates a representative machine architecture suitable for implementing the systems and so forth or for executing the methods disclosed herein. The machine of FIG. 9 is shown as a standalone device, which is suitable for implementation of the concepts above. For the server aspects described above a plurality of such machines operating in a data center, part of a cloud architecture, and so forth can be used. In server aspects, not all of the illustrated functions and devices are utilized. For example, while a system, device, etc. that a user uses to interact with a server and/or the cloud architectures may have a screen, a touch screen input, etc., servers often do not have screens, touch screens, cameras and so forth and typically interact with users through connected systems that have appropriate input and output aspects. Therefore, the architecture below should be taken as encompassing multiple types of devices and machines and various aspects may or may not exist in any particular device or machine depending on its form factor and purpose (for example, servers rarely have cameras, while wearables rarely comprise magnetic disks). However, the example explanation of FIG. 9 is suitable to allow those of skill in the art to determine how to implement the embodiments previously described with an appropriate combination of hardware and software, with appropriate modification to the illustrated embodiment to the particular device, machine, etc. used.

While only a single machine is illustrated, the term "machine" shall also be taken to include any collection of machines that individually or jointly execute a set (or multiple sets) of instructions to perform any one or more of the methodologies discussed herein.

The example of the machine 900 includes at least one processor 902 (e.g., a central processing unit (CPU), a graphics processing unit (GPU), advanced processing unit (APU), or combinations thereof), one or more memories such as a main memory 904, a static memory 906, or other types of memory, which communicate with each other via link 908. Link 908 may be a bus or other type of connection channel. The machine 900 may include further optional aspects such as a graphics display unit 910 comprising any type of display. The machine 900 may also include other optional aspects such as an alphanumeric input device 912 (e.g., a keyboard, touch screen, and so forth), a user interface (UI) navigation device 914 (e.g., a mouse, trackball, touch device, and so forth), a storage unit 916 (e.g., disk drive or other storage device(s)), a signal generation device 918 (e.g., a speaker), sensor(s) 921 (e.g., global positioning sensor, accelerometer(s), microphone(s), camera(s), and so forth), output controller 928 (e.g., wired or wireless connection to connect and/or communicate with one or more other devices such as a universal serial bus (USB), near field communication (NFC), infrared (IR), serial/parallel bus, etc.), and a network interface device 920 (e.g., wired and/or wireless) to connect to and/or communicate over one or more networks 926.

Executable Instructions and Machine-Readable Medium

The various memories (i.e., 904, 906, and/or memory of the processor(s) 902) and/or storage unit 916 may store one or more sets of instructions and data structures (e.g., software) 924 embodying or utilized by any one or more of the methodologies or functions described herein. These instructions, when executed by processor(s) 902 cause various operations to implement the disclosed embodiments.

As used herein, the terms "machine-readable medium," "computer-readable medium" and "device-readable medium" mean the same thing and may be used interchangeably in this disclosure. The terms include a single medium or multiple media (e.g., a centralized or distributed database, and/or associated caches and servers) that store the one or more instructions or data structures. The terms shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The terms shall accordingly be taken to include, but not be limited to, solid-state memories, and optical and magnetic media. Specific examples of machine-readable media, computer-readable media and/or device-readable media include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks. The terms machine-readable media, computer-readable media, and device-readable media specifically exclude non-statutory signals per se, which are covered under the term "signal medium" discussed below.

Signal Medium

The term "signal medium" shall be taken to include any form of modulated data signal and signals per se. The term "modulated data signal" means a signal that has one or more of its characteristics set or changed in such a matter as to encode information in the signal.

EXAMPLE EMBODIMENTS

Example 1

A method for completing a question comprising:
receiving, from a user, a question prefix representing a portion of a natural language question (212);
selecting (212, 406) at least one index comprising a short text index (210, 412) or a question term index (211, 408), the short text index comprising a plurality of text entries, each entry corresponding to an associated document, the question term index comprising a plurality of question entries, each entry corresponding to a partial question phrase;
searching the at least one index and retrieving a plurality of retrieved entries (213, 514);
identifying a subset of the plurality of retrieved entries (516);
creating a language model from the subset, the language model comprising a plurality of n-grams each with an n-gram probability (214);
creating a plurality of question completion suggestions based on the language model and the question prefix (216); and
causing presentation of the plurality of question completion suggestions to the user via a user interface (224).

Example 2

The method of example 1 wherein the plurality of retrieved entries each have an associated metric.

Example 3

The method of example 1 or 2 wherein each entry in the short text index comprises the title of a document.

Example 4

The method of example 2 wherein identifying the subset comprises:
ranking retrieved entries by the associated metric; and
selecting as the subset the top k entries in the ranked list.

Example 5

The method of example 1 or 2 wherein creating the plurality of question completion suggestions comprises:

generating a set of candidate completion suggestions based on the question prefix and the language model;
removing from the set of candidate completion suggestions candidate completion suggestions that do not comply with a set of grammar rules to create a subset of candidate completion suggestions; and
filtering the subset of candidate completion suggestions based on a filter criteria; and
ranking the filtered subset.

Example 6

The method of example 5 wherein the filter criteria selects one candidate completion suggestion associated with an underlying document and removes any other candidate completion suggestions associated with the underlying document.

Example 7

The method of example 5 wherein the filter criteria selects a candidate completion suggestion based on stored interaction data, the stored interaction data comprising user interactions with prior candidate completion suggestions presented to the user.

Example 8

The method of example 1 or 2 wherein:
the at least one index comprises a plurality of short text indexes;
the searching operation searches the plurality of short text indexes and retrieves a plurality of retrieved entries from each of the short text indexes;
the creating operation creates a plurality of language modes, each language model created from a subset of entries from a respective short text index, each language model comprising a plurality of n-grams each with an n-gram probability;
question completion suggestions are created based on each language model.

Example 9

The method of example 2 wherein the associated metric is derived from at least one of:
a number of times a document associated with the entry has been viewed;
a type of match between the question prefix and the entry; and
a number of times a document comes up in search results.

Example 10

A system for completing a question comprising:
a processor and executable instructions accessible on a computer-storage medium that, when executed, cause the processor to perform operations comprising:
receive, from a user, a question prefix representing a portion of a natural language question (212);
selecting (212, 406) at least one index comprising a short text index (210, 412) or a question term index (211, 408), the short text index comprising a plurality of text entries, each entry corresponding to an associated document, the question term index comprising a plurality of question entries, each entry corresponding to a partial question phrase;

search the at least one index and retrieve a plurality of retrieved entries (213, 514);

identify a subset of the plurality of the retrieved entries (516);

create a language model from the subset, the language model comprising a plurality of n-grams each with an n-gram probability (214);

create a plurality of question completion suggestions based on the language model and the question prefix (216);

return plurality of question completion suggestions to the user via a user interface (224); and store user interaction with the question completion suggestions (225).

Example 11

The system of example 10 wherein the plurality of retrieved entries each have an associated metric.

Example 12

The system of example 11 wherein identify the subset comprises:

rank the plurality of retrieved entries by the associated metric; and select as the subset the top k entries in the ranked list.

Example 13

The system of example 10 wherein each entry in the short text index comprises the title of a document.

Example 14

The system of example 10, 11, 12, or 13 wherein creating the plurality of question completion suggestions comprises:

generate a set of candidate completion suggestions based on the question prefix and the language model;

remove from the set of candidate completion suggestions candidate completion suggestions that do not comply with a set of grammar rules to create a subset of candidate completion suggestions; and filter the subset of candidate completion suggestions based on a filter criteria; and rank the filtered subset.

Example 15

The system of example 14 wherein the filter criteria selects one candidate completion suggestion associated with an underlying document and removes any other candidate completion suggestions associated with the underlying document.

Example 16

The system of example 14 wherein the filter criteria selects a candidate completion suggestion based on stored interaction data, the stored interaction data comprising user interactions with prior candidate completion suggestions presented to the user.

Example 17

A computer storage medium comprising executable instructions that, when executed by a processor of a machine, cause the machine to perform operations comprising:

receive, from a user, a question prefix representing a portion of a natural language question (212);

selecting (212, 406) at least one index comprising a short text index (210, 412) or a question term index (211, 408), the short text index comprising a plurality of text entries, each entry corresponding to an associate document, the question term index comprising a plurality of question entries, each entry corresponding to a partial question phrase;

search the at least one index and retrieve a plurality of retrieved entries (213, 514), the plurality of retrieved entries comprising the title of a document or the partial question phrase, or both;

identify a subset of the plurality of the retrieved entries (516);

create a language model from the subset, the language model comprising a plurality of n-grams each with an n-gram probability (214);

create a plurality of question completion suggestions based on the language model and the question prefix (216); and return plurality of question completion suggestions to the user via a user interface (224).

Example 18

The medium of example 17 wherein the plurality of retrieved entries each have a metric derived from at least one of:

a number of times a document associated with the entry has been viewed;

a type of match between the question prefix and the entry; and a number of times a document comes up in search results.

Example 19

The medium of example 17 or 18 wherein creating the plurality of question completion suggestions comprises:

generate a set of candidate completion suggestions based on the question prefix and the language model;

remove from the set of candidate completion suggestions candidate completion suggestions that do not comply with a grammar to create a subset of candidate completion suggestions; and filter the subset of candidate completion suggestions based on a filter criteria; and rank the filtered subset.

Example 20

The medium of example 19 wherein the at least one index comprises a plurality of short text indexes;

the search operation searches the plurality of short text indexes and retrieves a plurality of retrieved entries from each of the short text indexes;

the create operation creates a plurality of language modes, each language model created from a subset of entries from a respective short text index, each language model comprising a plurality of n-grams each with an n-gram probability;

question completion suggestions are created based on each language model.

Example 21

A method for completing a question comprising:

receiving, from a user, a question prefix representing a portion of a natural language question (212);

selecting (212, 406) at least one index comprising a short text index (210, 412) or a question term index (211, 408), the short text index comprising a plurality of text entries, each entry corresponding to an associated document, the question term index comprising a plurality of question entries, each entry corresponding to a partial question phrase;

searching the at least one index and retrieving a plurality of retrieved entries (213, 514);

identifying a subset of the plurality of retrieved entries (516);

creating a language model from the subset, the language model comprising a plurality of n-grams each with an n-gram probability (214);

creating a plurality of question completion suggestions based on the language model and the question prefix (216); and causing presentation of the plurality of question completion suggestions to the user via a user interface (224).

Example 22

The method of example 21 wherein the plurality of retrieved entries each have an associated metric.

Example 23

The method of example 21 or 22 wherein each entry in the short text index comprises the title of a document.

Example 24

The method of example 22 or 23 wherein identifying the subset comprises:
ranking retrieved entries by the associated metric; and
selecting as the subset the top k entries in the ranked list.

Example 25

The method of example 21, 22, 23, or 24 wherein creating the plurality of question completion suggestions comprises:
generating a set of candidate completion suggestions based on the question prefix and the language model;
removing from the set of candidate completion suggestions candidate completion suggestions that do not comply with a set of grammar rules to create a subset of candidate completion suggestions; and
filtering the subset of candidate completion suggestions based on a filter criteria; and
ranking the filtered subset.

Example 26

The method of example 25 wherein the filter criteria selects one candidate completion suggestion associated with an underlying document and removes any other candidate completion suggestions associated with the underlying document.

Example 27

The method of example 25 wherein the filter criteria selects a candidate completion suggestion based on stored interaction data, the stored interaction data comprising user interactions with prior candidate completion suggestions presented to the user.

Example 28

The method of example 25 further comprising removing candidate completion suggestions based on prior user interactions.

Example 29

The method of example 21, 22, 23, 24, 25, 26, 27, or 28, wherein:
the at least one index comprises a plurality of short text indexes;
the searching operation searches the plurality of short text indexes and retrieves a plurality of retrieved entries from each of the short text indexes;
the creating operation creates a plurality of language modes, each language model created from a subset of entries from a respective short text index, each language model comprising a plurality of n-grams each with an n-gram probability;
question completion suggestions are created based on each language model.

Example 30

The method of example 22 wherein the associated metric is derived from at least one of:
a number of times a document associated with the entry has been viewed;
a type of match between the question prefix and the entry; and
a number of times a document comes up in search results.

Example 31

The method of example 21, 22, 23, 24, 25, 26, 27, 28, 29, or 30, wherein selecting the at least one index comprising the short text index or the question term index comprises:
identifying whether the question prefix comprises substantive words;
responsive to identifying that the question prefix comprises substantive words, selecting one or more sort text indexes;
responsive to identifying that the question prefix does not comprise substantive words, selecting the question term index.

Example 32

The method of example 31 further comprising:
retrieving prior user interaction information; and
selecting the one or more short text indexes based on the prior user interaction information.

Example 33

The method of example 21, 22, 23, 24, 25, 26, 27, 28, 29, 30, 31 or 32, wherein identifying a subset of the plurality of retrieved entries comprises:
ranking the plurality of returned entries according to a score; and selecting as the subset, the top k entries of the ranked entries.

Example 34

An apparatus comprising means to perform a method as in any preceding example.

Example 35

Machine-readable storage including machine-readable instructions, when executed, to implement a method or realize an apparatus as in any preceding example.

CONCLUSION

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

What is claimed is:

1. A method for completing a question comprising:
receiving, from a user, a question prefix representing a portion of a natural language question;
selecting, based on the question prefix, at least one index comprising a short text index or a question term index, the short text index comprising a plurality of text entries, each entry corresponding to an associated document, the question term index comprising a plurality of question entries, each entry corresponding to a partial question phrase;
searching the selected at least one index using the question prefix and retrieving a plurality of retrieved entries;
selecting a subset of the plurality of retrieved entries;
responsive to selecting the subset, creating a language model from the subset, the language model comprising a plurality of n-grams each with an n-gram probability;
creating a plurality of question completion suggestions based on the language model and the question prefix; and
causing presentation of the plurality of question completion suggestions to the user via a user interface.

2. The method of claim 1 wherein the plurality of retrieved entries each have an associated metric.

3. The method of claim 1 wherein each entry in the short text index comprises the title of a document.

4. The method of claim 2 wherein selecting the subset comprises:
ranking retrieved entries by the associated metric; and
selecting as the subset the top k entries in the ranked list.

5. The method of claim 1 wherein creating the plurality of question completion suggestions comprises:
generating a set of candidate completion suggestions based on the question prefix and the language model;
removing from the set of candidate completion suggestions candidate completion suggestions that do not comply with a set of grammar rules to create a subset of candidate completion suggestions; and
filtering the subset of candidate completion suggestions based on a filter criteria; and
ranking the filtered subset.

6. The method of claim 5 wherein the filter criteria selects one candidate completion suggestion associated with an underlying document and removes any other candidate completion suggestions associated with the underlying document.

7. The method of claim 5 wherein the filter criteria selects a candidate completion suggestion based on stored interaction data, the stored interaction data comprising user interactions with prior candidate completion suggestions presented to the user.

8. The method of claim 1 wherein:
the selected at least one index comprises a plurality of short text indexes;
the searching operation searches the plurality of short text indexes and retrieves a plurality of retrieved entries from each of the short text indexes;
the creating operation creates a plurality of language models, each language model created from a subset of entries from a respective short text index, each language model comprising a plurality of n-grams each with an n-gram probability;
question completion suggestions are created based on each language model.

9. The method of claim 2 wherein the associated metric is derived from at least one of:
a number of times a document associated with the entry has been viewed;
a type of match between the question prefix and the entry; and
a number of times a document comes up in search results.

10. A system for completing a question comprising:
a processor and executable instructions accessible on a computer-storage medium that, when executed, cause the processor to perform operations comprising:
receive, from a user, a question prefix representing a portion of a natural language question;
selecting at least one index comprising a short text index or a question term index, the short text index comprising a plurality of text entries, each entry corresponding to an associated document, the question term index comprising a plurality of question entries, each entry corresponding to a partial question phrase;
search the at least one index and retrieve a plurality of retrieved entries;
identify a subset of the plurality of the retrieved entries;
create a language model from the subset, the language model comprising a plurality of n-grams each with an n-gram probability;
create a plurality of question completion suggestions based on the language model and the question prefix;
return plurality of question completion suggestions to the user via a user interface; and
store user interaction with the question completion suggestions.

11. The system of claim 10 wherein the plurality of retrieved entries each have an associated metric.

12. The system of claim 11 wherein identify the subset comprises:
rank the plurality of retrieved entries by the associated metric; and
select as the subset the top k entries in the ranked list.

13. The system of claim 10 wherein each entry in the short text index comprises the title of a document.

14. The system of claim 10 wherein creating the plurality of question completion suggestions comprises:
generate a set of candidate completion suggestions based on the question prefix and the language model;

remove from the set of candidate completion suggestions candidate completion suggestions that do not comply with a set of grammar rules to create a subset of candidate completion suggestions; and filter the subset of candidate completion suggestions based on a filter criteria; and rank the filtered subset.

15. The system of claim 14 wherein the filter criteria selects one candidate completion suggestion associated with an underlying document and removes any other candidate completion suggestions associated with the underlying document.

16. The system of claim 14 wherein the filter criteria selects a candidate completion suggestion based on stored interaction data, the stored interaction data comprising user interactions with prior candidate completion suggestions presented to the user.

17. A computer storage medium comprising executable instructions that, when executed by a processor of a machine, cause the machine to perform operations comprising:

receive, from a user, a question prefix representing a portion of a natural language question;

selecting, based on the question prefix, at least one index comprising a short text index or a question term index, the short text index comprising a plurality of text entries, each entry corresponding to an associate document, the question term index comprising a plurality of question entries, each entry corresponding to a partial question phrase;

search the at least one index and retrieve a plurality of retrieved entries, the plurality of retrieved entries comprising the title of a document or the partial question phrase, or both;

select a subset of the plurality of the retrieved entries;

create a language model from the subset, the language model comprising a plurality of n-grams each with an n-gram probability;

create a plurality of question completion suggestions based on the language model and the question prefix; and return plurality of question completion suggestions to the user via a user interface.

18. The medium of claim 17 wherein the plurality of retrieved entries each have a metric derived from at least one of:

a number of times a document associated with the entry has been viewed;

a type of match between the question prefix and the entry; and a number of times a document comes up in search results.

19. The medium of claim 17 wherein creating the plurality of question completion suggestions comprises:

generate a set of candidate completion suggestions based on the question prefix and the language model;

remove from the set of candidate completion suggestions candidate completion suggestions that do not comply with a grammar to create a subset of candidate completion suggestions; and filter the subset of candidate completion suggestions based on a filter criteria; and rank the filtered subset.

20. The medium of claim 19 wherein the at least one index comprises a plurality of short text indexes;

the search operation searches the plurality of short text indexes and retrieves a plurality of retrieved entries from each of the short text indexes;

the create operation creates a plurality of language models, each language model created from a subset of entries from a respective short text index, each language model comprising a plurality of n-grams each with an n-gram probability;

question completion suggestions are created based on each language model.

* * * * *